(12) United States Patent
Kuroda et al.

(10) Patent No.: US 9,121,475 B2
(45) Date of Patent: Sep. 1, 2015

(54) DRIVE TRANSMISSION APPARATUS AND IMAGE FORMING APPARATUS

(71) Applicant: CANON KABUSHIKI KAISHA, Tokyo (JP)

(72) Inventors: Akira Kuroda, Numazu (JP); Taku Fukita, Toride (JP); Yoshiyuki Yamazaki, Fujisawa (JP); Noritomo Yamaguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/379,570

(22) PCT Filed: Apr. 23, 2013

(86) PCT No.: PCT/JP2013/062679
§ 371 (c)(1),
(2) Date: Aug. 19, 2014

(87) PCT Pub. No.: WO2013/165009
PCT Pub. Date: Nov. 7, 2013

(65) Prior Publication Data
US 2015/0033888 A1   Feb. 5, 2015

(30) Foreign Application Priority Data
May 2, 2012   (JP) ................................. 2012-105102

(51) Int. Cl.
*G03B 15/00*   (2006.01)
*F16H 1/20*   (2006.01)
(Continued)

(52) U.S. Cl.
CPC ................ *F16H 1/20* (2013.01); *B65H 3/0607* (2013.01); *B65H 3/0669* (2013.01);
(Continued)

(58) Field of Classification Search
CPC ......................................................... F16H 1/20
USPC ............................................................ 399/167
See application file for complete search history.

(56) References Cited

U.S. PATENT DOCUMENTS 3,426,608 A   2/1969   Loughran et al.
5,633,699 A *   5/1997   Aruga et al. .................. 399/107
(Continued)

FOREIGN PATENT DOCUMENTS

JP   51-032229 B1   9/1976
JP   10-153247 A   6/1998
(Continued)

OTHER PUBLICATIONS

Notification Concerning Transmittal of Translation of the International Preliminary Report on Patentability and the Written Opinion of the International Searching Authority dated Nov. 13, 2014, in International Application No. PCT/JP2013/062679.
U.S. Appl. No. 14/498,097 to Takuji Uesugi et al., filed Sep. 26, 2014.

*Primary Examiner* — Rodney Fuller
(74) *Attorney, Agent, or Firm* — Fitzpatrick, Cella, Harper & Scinto

(57) ABSTRACT

A drive transmission apparatus in which, when immobilization of a preceding gear (21) by a solenoid (22) is canceled, an urging portion urges the preceding gear (21) to rotate in a direction in which the preceding gear (21) meshes with an input gear (24) which rotates at a constant velocity. An interlocking portion causes an output gear (20) to mesh with the input gear (24) in association with the rotation of the preceding gear (21), to rotate the output gear (20) at a low velocity, and to rotate the output gear (20) at a high velocity when the output gear (20) rotates by a predetermined amount.

10 Claims, 22 Drawing Sheets

(51) Int. Cl.
*F16H 27/08* (2006.01)
*G03G 21/16* (2006.01)
*B65H 3/06* (2006.01)
*B65H 3/52* (2006.01)
*F16H 55/17* (2006.01)

(52) U.S. Cl.
CPC .............. *B65H 3/5223* (2013.01); *F16H 27/08* (2013.01); *F16H 55/17* (2013.01); *G03G 21/1647* (2013.01); *G03G 21/1676* (2013.01); *B65H 2403/421* (2013.01); *B65H 2403/512* (2013.01); *B65H 2403/724* (2013.01); *B65H 2404/1112* (2013.01)

(56) References Cited

U.S. PATENT DOCUMENTS

| | | | | |
|---|---|---|---|---|
| 5,950,052 | A | * | 9/1999 | Nomura et al. ............... 399/167 |
| 6,070,867 | A | | 6/2000 | Tsurumi et al. |
| 2009/0196655 | A1 | * | 8/2009 | Takigawa et al. ............. 399/167 |
| 2014/0239581 | A1 | * | 8/2014 | Le ................................ 271/253 |

FOREIGN PATENT DOCUMENTS

| | | |
|---|---|---|
| JP | 2007-064343 A | 3/2007 |
| JP | 2008-056413 A | 7/2008 |
| JP | 2008-157326 A | 7/2008 |

* cited by examiner

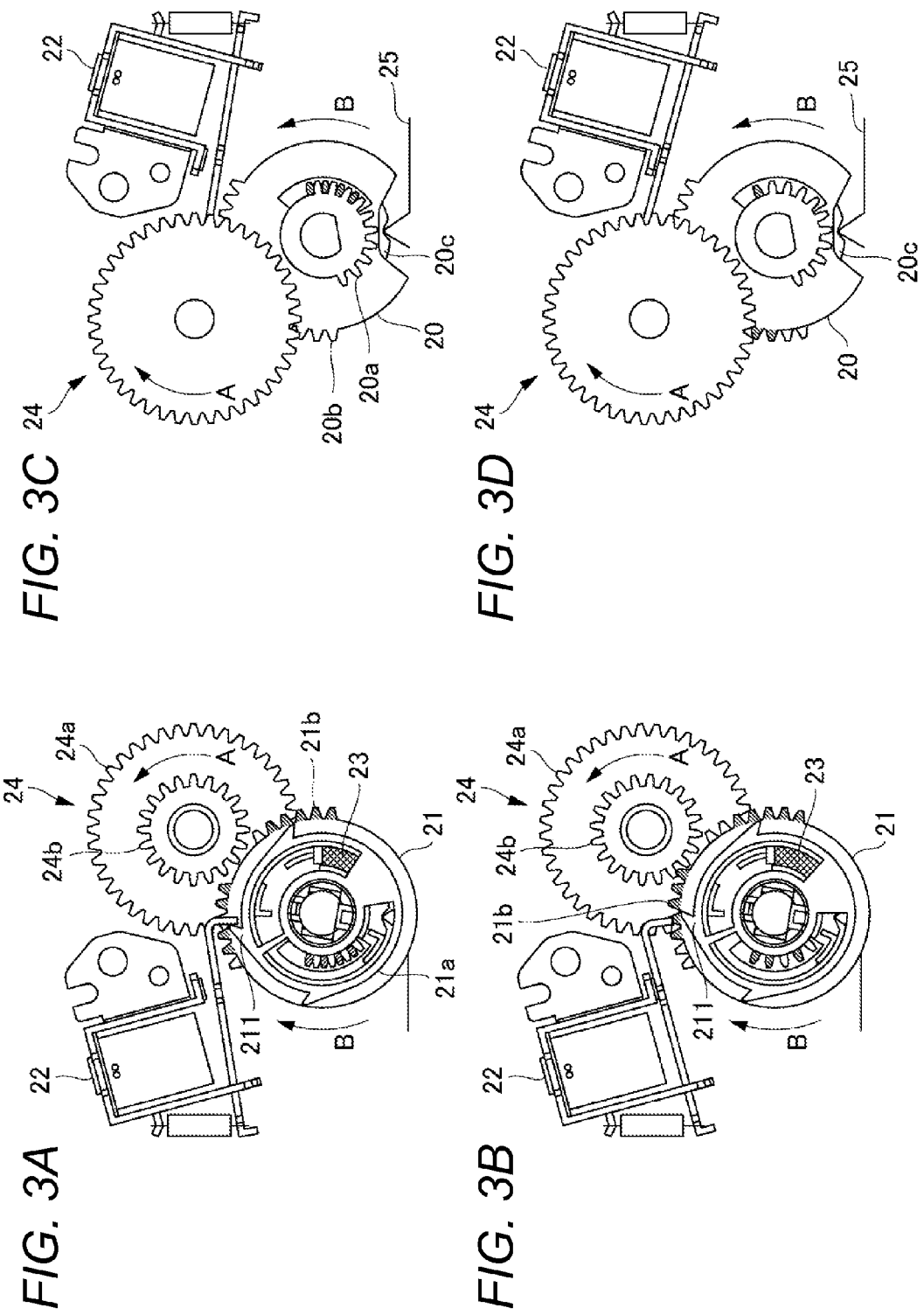

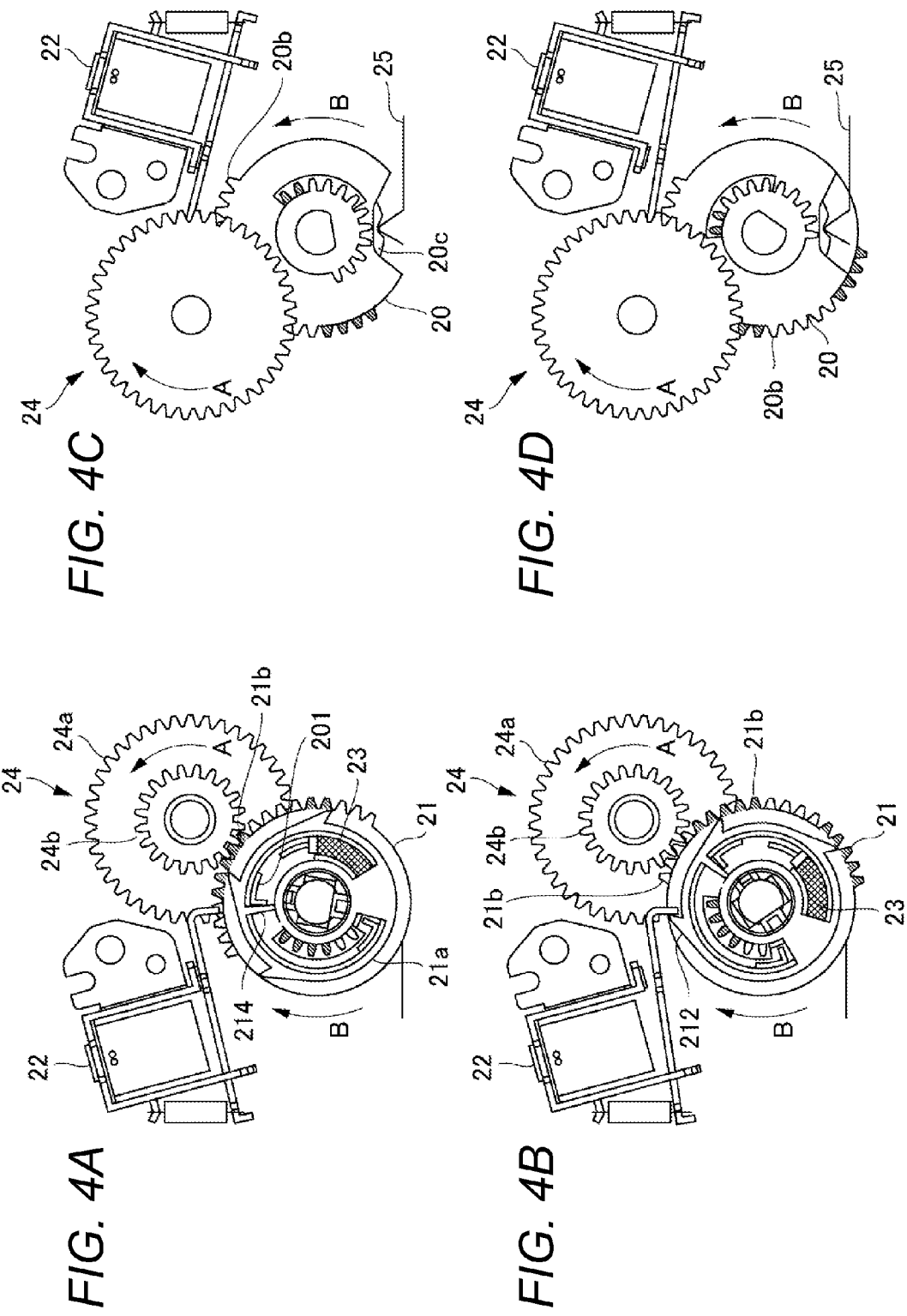

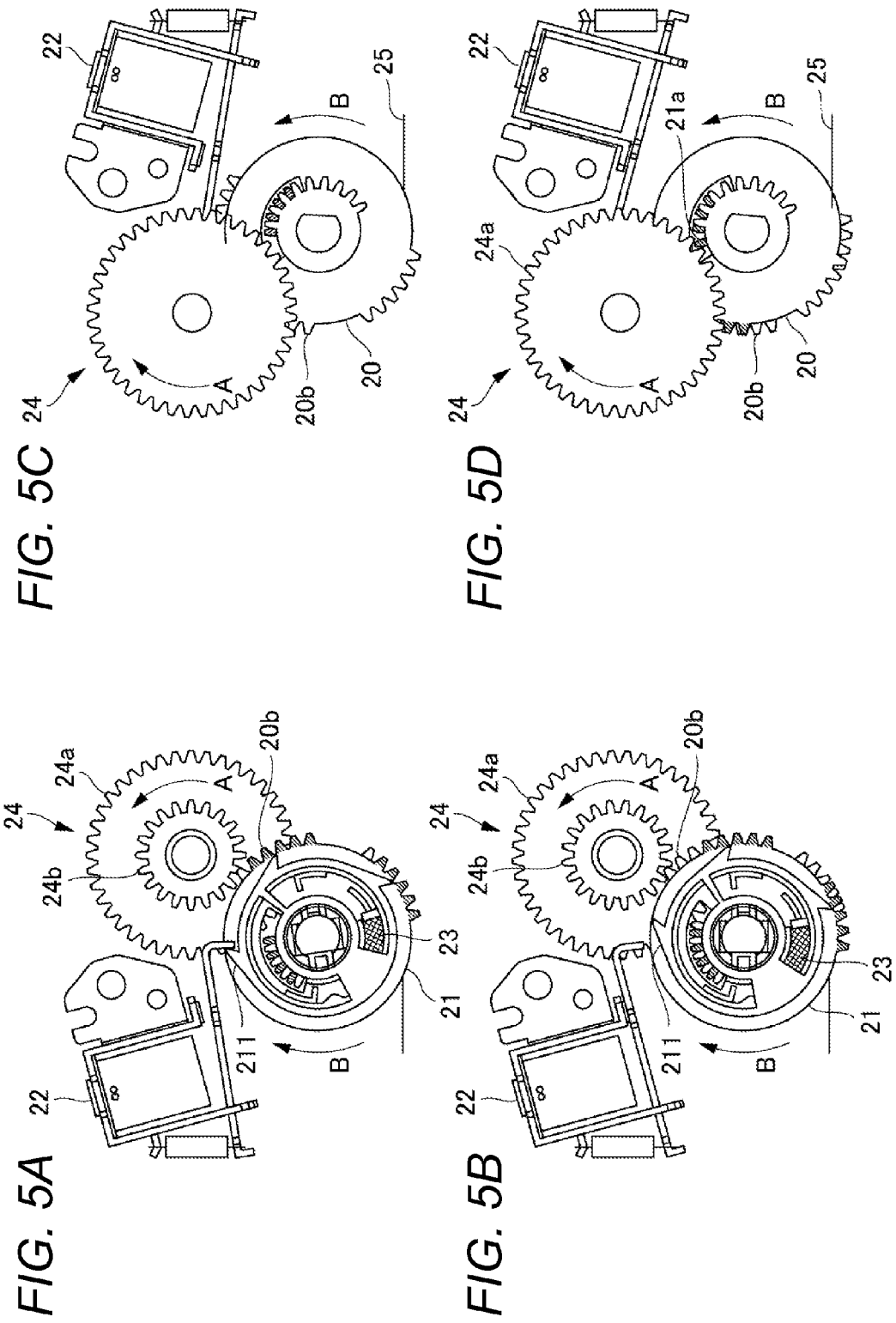

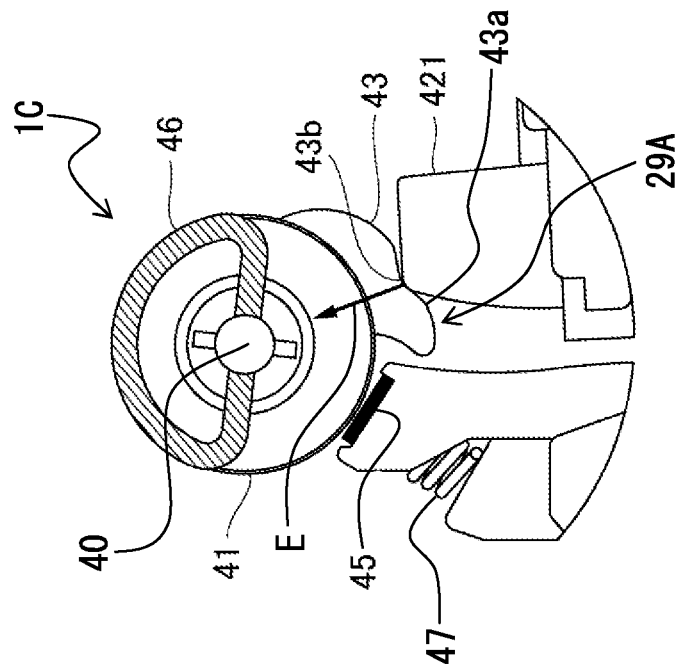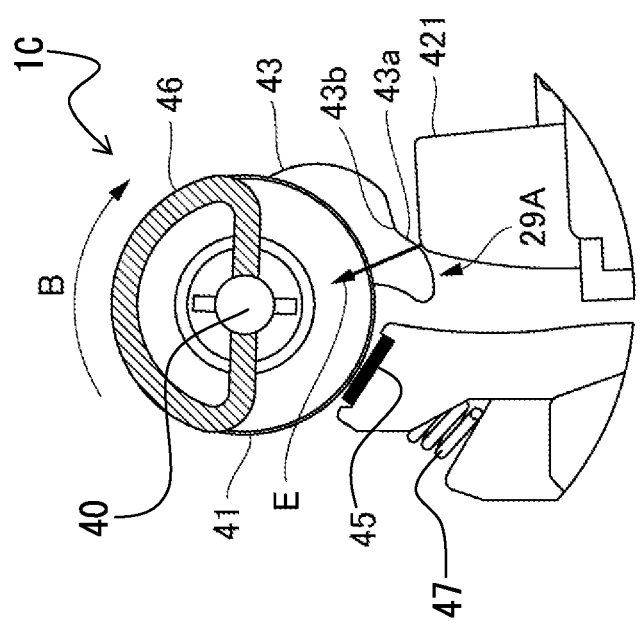

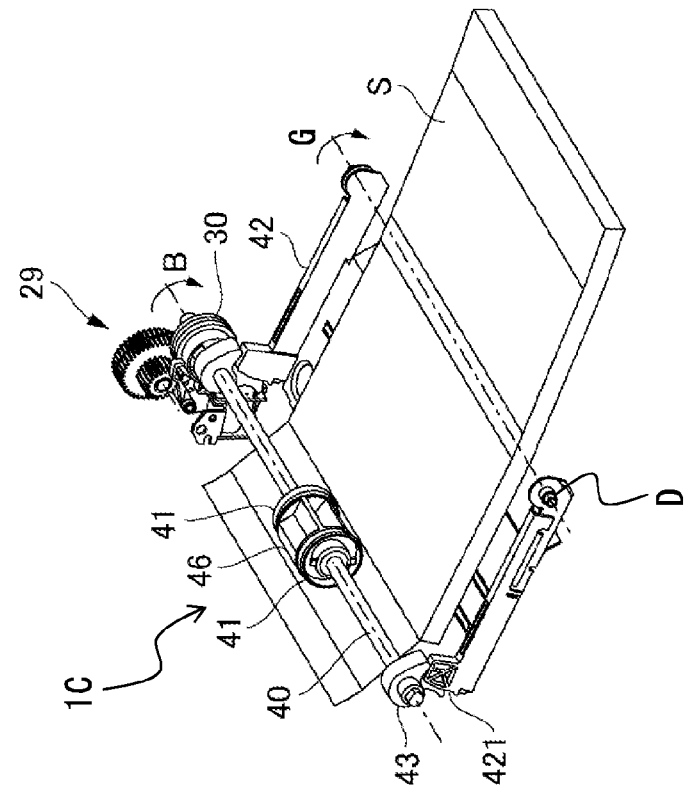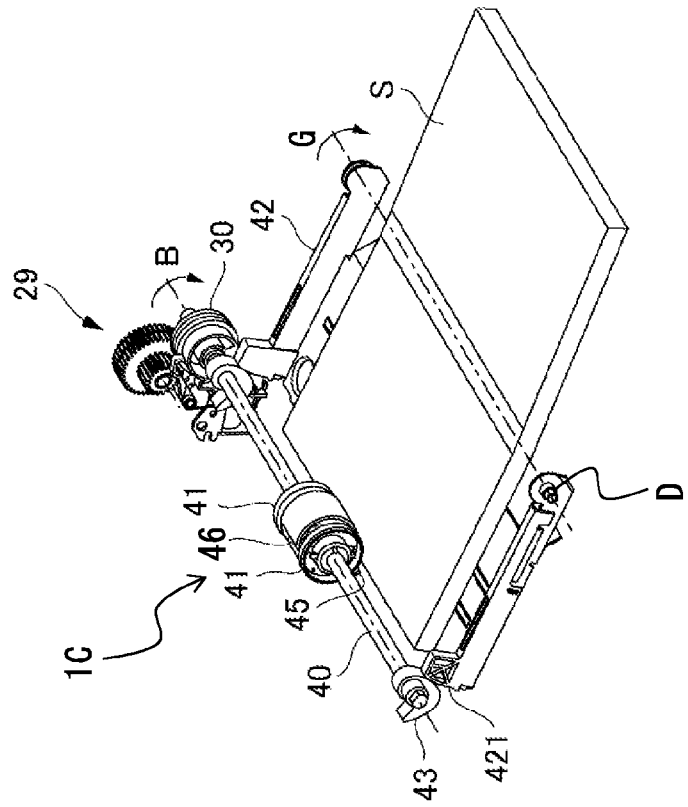

PRIOR ART

DRIVE TRANSMISSION APPARATUS AND IMAGE FORMING APPARATUS

TECHNICAL FIELD

The present invention relates to a drive transmission apparatus and an image forming apparatus including the drive transmission apparatus.

BACKGROUND ART

Conventionally, an image forming apparatus such as a copying machine, a printer, a facsimile machine, and a multifunction peripheral having functions of those apparatus may include a sheet feed device configured to feed a sheet by a feed roller, and a rotary developing device configured to develop an electrostatic latent image formed on a photosensitive drum. As such an image forming apparatus, there is an image forming apparatus in which the feed roller and the rotary developing device are driven by the drive of a drive motor being transmitted to the feed roller and the rotary developing device by a drive transmission apparatus at a predetermined timing.

FIG. 21 is a view illustrating a structure of a rotary developing device which is provided in a conventional electrophotographic color image forming apparatus and is configured to receive the drive transmitted by the drive transmission apparatus as described above. In FIG. 21, a rotary developing device 203A includes developing units 201Y, 201M, 201C, and 201K which contain yellow, magenta, cyan, and black developers, respectively. The developing units 201Y, 201M, 201C, and 201K include developing rollers 202Y, 202M, 202C, and 202K, respectively, and are supported by a rotary holder 203. Note that, FIG. 21 illustrates a state in which the yellow developing unit 201Y is located at a developing position, and in this state, the developing roller 202Y abuts against a photosensitive drum 204 to develop the latent image on the photosensitive drum 204 with the yellow developer.

A drive transmission apparatus 200 includes an input gear 205 which rotates at a constant velocity in the direction indicated by the arrow L in FIG. 21 by a drive source (not shown), and an output gear 206 which rotates at a predetermined timing. The output gear 206 includes a partially-toothless gear 206a having a toothless portion, and a control cylinder 206b to be latched by a solenoid 208. Further, one end of an urging spring 207 is hooked on the control cylinder 206b, and the urging spring 207 urges the output gear 206 in the direction indicated by the arrow H in FIG. 21.

Note that, in the drive transmission apparatus 200 having the above-mentioned structure, when the solenoid 208 is turned ON at a predetermined timing in the initial state in FIG. 21 so that the control cylinder 206b is unlatched, the urging spring 207 urges the output gear 206 to rotate in the direction indicated by the arrow H in FIG. 21. Accordingly, the partially-toothless gear 206a starts to mesh with the input gear 205 to transmit a drive force to the output gear 206. When the output gear 206 then performs substantially one revolution and the meshing of output gear 206 with the input gear 205 is terminated, the urging spring 207 urges the output gear 206 to rotate up to the latch position with the solenoid 208. At this time, when the solenoid 208 is turned OFF, the control cylinder 206b is latched by the solenoid 208, and the output gear 206 is brought into the initial state so that the drive force transmission is halted.

Further, in FIG. 21, a development switching mechanism 200A is configured to rotate the rotary holder 203 due to the drive force transmitted to the drive transmission apparatus 200 so as to switch the developing units 201Y, 201M, 201C, and 201K to be brought into abutment against the photosensitive drum 204. The development switching mechanism 200A includes a rotary holder gear 203a which is formed on an outer periphery of the rotary holder 203, and a small gear 209 which is provided coaxially with the output gear 206 and meshes with the rotary holder gear 203a.

When the solenoid 208 is turned ON at the predetermined timing, the output gear 206 rotates in the direction indicated by the arrow H in FIG. 21, and the rotary holder 203 rotates in the direction indicated by the arrow W in FIG. 21. In this case, the number of teeth of the rotary holder gear 203a is "4n" ("n" is an integer) times larger than the number of teeth of the small gear 209, and hence, when the output gear 206 performs "n" revolutions by the drive transmission apparatus 200, the rotary holder 203 accurately performs a quarter revolution. Accordingly, the developing units 201Y, 201M, 201C, and 201K sequentially move to the developing position at predetermined timings to develop the latent images on the photosensitive drum 204 with the developers of the respective colors.

By the way, in the drive transmission apparatus 200 as described above, after the output gear 206 is unlatched from the solenoid 208, the urging spring 207 urges the output gear 206 with a force in its rotation direction (motive torque) so that the output gear 206 meshes with the input gear 205. On the other hand, an output member such as the rotary holder 203 is drivingly coupled to the output gear 206, and hence a drive load or inertial force of the output member is exerted on the output gear 206 in its reverse rotation direction.

Thus, a force which is equal to or greater than the drive load or inertial force of the output member is necessary as the motive torque, but the increase in motive torque results in upsizing of the solenoid 208 configured to latch and unlatch the output gear 206 in order to generate a force against the motive torque. Further, when the motive torque greater than necessary is exerted on the output gear 206, the output gear 206 unlatched from the solenoid 208 is rotated at high velocity, which leads to a risk of irregular rotation of the output gear 206.

Therefore, in the conventional technology, there is disclosed a structure in which a partially-toothless gear configured to mesh with an input gear 205 prior to an output gear 206 is provided so that the output gear meshes with the input gear in association with the rotation of the partially-toothless gear (see Patent Literature 1). With this structure, the motive torque for the partially-toothless gear can be set irrespective of a drive load or inertial force of an output member coupled to the output gear, and hence the problem arising from the motive torque is solved to some extent.

In recent years, higher-speed image forming apparatus have been developed, and on the other hand, ecological measures have been demanded on the apparatus main body. In particular, there has been demanded suppression of noise of the image forming apparatus in operation. In the rotary holder rotation control to be performed using the conventional drive transmission apparatus 200 as illustrated in FIG. 21, however, in the initial stage and the later stage of the rotary holder rotation, the developing roller is separated from and brought into abutment against the photosensitive drum at the developing position. Therefore, along with the increase in operation speed of the image forming apparatus, a period required to switch the developing units of the respective colors is shortened, in other words, an angular velocity of the rotary holder is increased. As a result, vibration and impact sound of the image forming apparatus at the time of separation and abutment become conspicuous.

In view of the above, in order to suppress the impact sound, for example, there is a technology of reducing the angular velocity of the rotary holder only at the time of separation and abutment. FIG. 22 is a view illustrating a structure configured to set a variable angular velocity at the time of drive transmission. In FIG. 22, an input gear 1211 includes an input small gear 1211a and an input large gear 1211b, and rotates at a constant velocity in the direction indicated by the arrow R in FIG. 22. An output gear 1212 receives the drive transmitted from the input gear 1211. The output gear 1212 includes an output large gear 1212a and an output small gear 1212b which have toothless portions and mesh with the input small gear 1211a and the input large gear 1211b of the input gear 1211 in an alternate manner.

In a state in which the input small gear 1211a meshes with the output large gear 1212a, the output gear 1212 is driven at a low velocity, and in a state in which the input large gear 1211b meshes with the output small gear 1212b, the output gear 1212 is driven at a high velocity. Accordingly, the output gear 1212 can be rotated at the low velocity only at the time of abutment and separation, and thus the impact sound can be suppressed.

CITATION LIST

Patent Literature

PTL 1: Japanese Patent Application Laid-Open No. H10-153247

In the image forming apparatus including the drive transmission apparatus having the above-mentioned structure, however, it is necessary that the mesh between the input small gear 1211a and the output large gear 1212a and the mesh between the input large gear 1211b and the output small gear 1212b do not occur at the same time. Therefore, a predetermined phase angle indicated by the symbol "α" in FIG. 22 needs to be set between the toothed portion of the output large gear 1212a and the toothed portion of the output small gear 1212b. As a result, a rotation urging unit configured to rotate the output gear 1212 in the direction indicated by the arrow N in FIG. 22 is necessary so that the output small gear 1212b meshes with the input large gear 1211b, but when such a rotation urging unit is provided, the above-mentioned problem with the motive torque is presented.

SUMMARY OF INVENTION

The present invention has been made in view of the above-mentioned circumstances, and therefore provides a drive transmission apparatus configured to transmit drive smoothly as well as suppressing vibration and impact sound, and provides an image forming apparatus including the drive transmission apparatus.

According to an embodiment of the present invention, there is provided a drive transmission apparatus, including: a drive gear having a first drive gear and a second drive gear, the drive gear being drivable by a drive source to rotate at a constant velocity; an output gear having a first output gear which has a toothless portion and is configured to mesh with the first drive gear, and a second output gear which has a toothless portion and is configured to mesh with the second drive gear; a preceding gear having a first preceding gear which has a toothless portion and is configured to mesh with the first drive gear, and a second preceding gear which has a toothless portion and is configured to mesh with the second drive gear; a preceding gear regulating portion configured to regulate rotation of the preceding gear; an urging portion configured to urge the preceding gear to mesh with the drive gear; and an interlocking portion configured to integrally rotate the output gear in association with the rotation of the preceding gear so that the output gear meshes with the drive gear, wherein the drive gear, the preceding gear, and the output gear are configured in a manner that: the second preceding gear meshes with the second drive gear when regulation of the rotation of the preceding gear by the preceding gear regulating portion is canceled and the urging portion urges the preceding gear to rotate, and the second output gear meshes with the second drive gear when the interlocking portion rotates the output gear integrally with the preceding gear so that the output gear rotates at a first velocity; and when the second output gear then terminates a meshing relationship with the second drive gear, the first output gear meshes with the first drive gear so that the output gear rotates at a second velocity.

Further features of the present invention will become apparent from the following description of exemplary embodiments with reference to the attached drawings.

BRIEF DESCRIPTION OF DRAWINGS

FIGS. 3A, 3B, 3C, and 3D are explanatory views illustrating a drive transmission operation of the drive transmission apparatus.

FIGS. 4A, 4B, 4C, and 4D are explanatory views illustrating the drive transmission operation of the drive transmission apparatus.

FIGS. 5A, 5B, 5C, and 5D are explanatory views illustrating the drive transmission operation of the drive transmission apparatus.

FIGS. 18A and 18B are explanatory views illustrating a latch mechanism provided in the sheet feed device.

FIGS. 19A and 19B are explanatory views illustrating a sheet feed operation of the sheet feed device.

DESCRIPTION OF EMBODIMENTS

Figure 1:
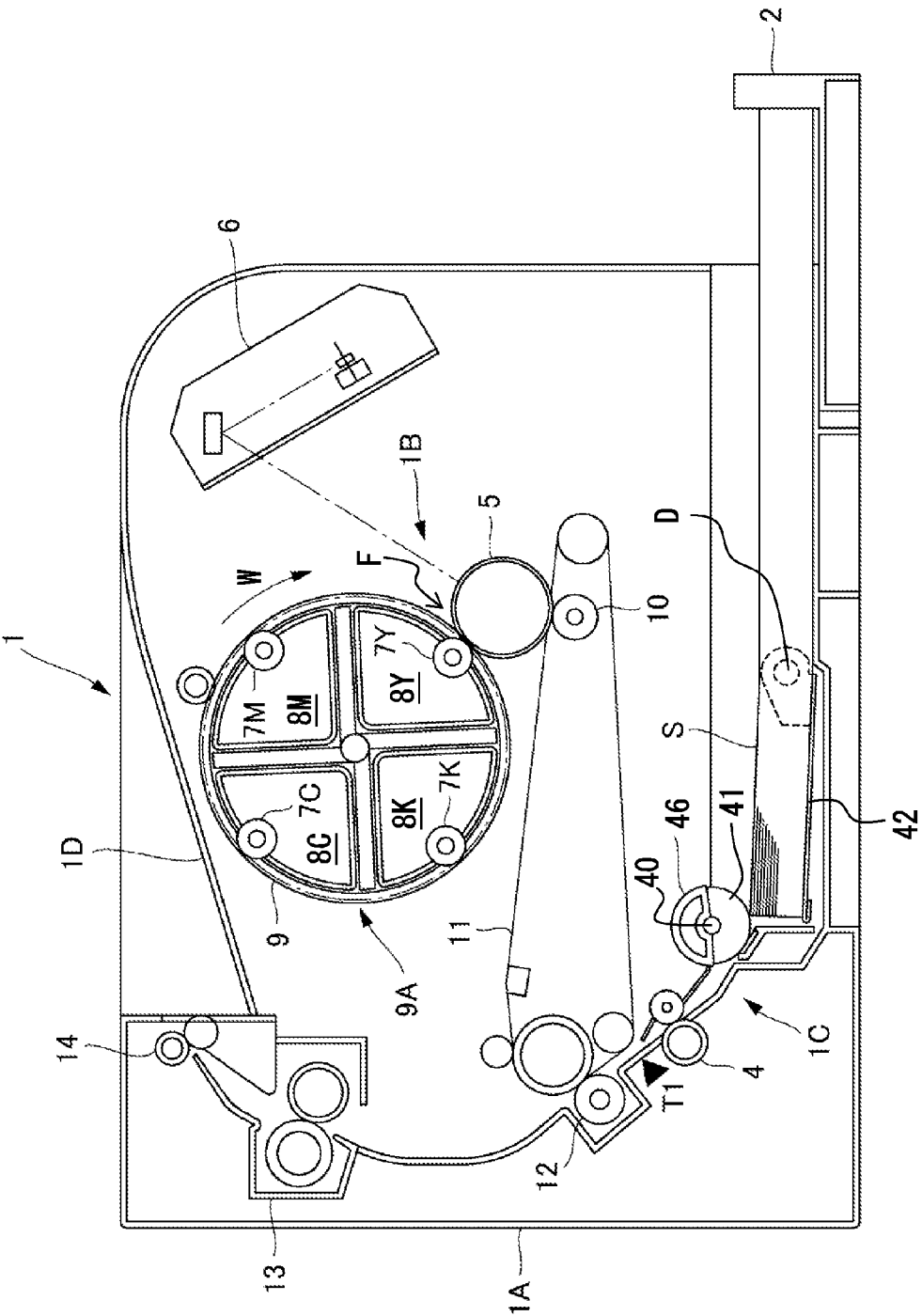
FIG. 1 is a view illustrating a schematic structure of a color laser printer as an example of an image forming apparatus according to a first embodiment of the present invention.

The embodiments of the present invention will hereinafter be described in detail with reference to the accompanying drawings. FIG. 1 is a view illustrating a structure of a color laser printer 1 as an example of an image forming apparatus according to a first embodiment of the present invention. In FIG. 1, the color laser printer 1 includes a color laser printer main body (hereinafter referred to as "printer main body") 1A as a main body of the image forming apparatus. The printer main body 1A includes an image forming portion 1B and a sheet feed device 1C configured to feed a sheet S to the image forming portion 1B.

The image forming portion 1B includes a photosensitive drum 5 serving as an image bearing member, a rotary developing device 9A serving as a rotary developing device of the present invention, and a scanner unit 6. Further, the image forming portion 1B includes an endless intermediate transfer belt 11, and a primary transfer roller 10 configured to sequentially transfer, onto the intermediate transfer belt 11, toner images formed on the photosensitive drum 5. Still further, the image forming portion 1B includes a secondary transfer roller 12 configured to transfer, onto the sheet S, a multi-color image formed by superimposing the four color toner images which are sequentially transferred onto the intermediate transfer belt 11. The sheet feed device 1C includes a feed roller 46 configured to feed the sheet S from a cassette 2 which stores sheets S and is detachably mounted to the printer main body 1A. The feed roller 46 is configured to feed a sheet S stored in the cassette 2 toward the image forming portion 1B.

Next, an operation of the color laser printer 1 having the above-mentioned structure will be described. When a control device (not shown) provided in the printer main body 1A outputs an image formation signal, an optical image which is formed based on an optical signal converted from an image signal is projected from the scanner unit 6 onto the photosensitive drum 5. At this time, the photosensitive drum 5 is charged by a charging unit (not shown) in advance, and through the projection of the optical image, electrostatic latent images of four colors are sequentially formed on the photosensitive drum 5. Note that, image information of four colors is information corresponding to yellow, cyan, magenta, and black images.

Subsequently, the electrostatic latent images are developed by a plurality of developing units 8 (8Y, 8M, 8C, and 8K) provided in a rotatable rotary holder 9 of the rotary developing device 9A. First, the electrostatic latent image is developed by one of the plurality of developing units 8, which corresponds to the first selected color, and a toner image of the first color is formed on the photosensitive drum 5. After that, the toner image formed on the photosensitive drum 5 is transferred onto the intermediate transfer belt 11 by the primary transfer roller 10 at a transfer position. In a case of a color print mode, the intermediate transfer belt 11 having the toner image transferred thereto further rotates so that the succeeding toner image is formed and transferred thereto. Note that, during this period, the rotary developing device 9A rotates the developing unit of the second designated color at an angle of 90° in the direction indicated by the arrow W so that the developing unit is opposed to the photosensitive drum 5, to thereby prepare for the succeeding development of the electrostatic latent image. After that, similarly to the first color, formation of the latent image, development thereof, and primary transfer of the toner image are repeated for the second color, the third color, and the fourth color, and the toner images of the respective colors are sequentially superimposed on the intermediate transfer belt 11. Note that, the developing unit 8Y contains yellow developer, and forms a yellow toner image by a developing roller 7Y. The developing unit 8M contains magenta developer, and forms a magenta toner image by a developing roller 7M. The developing unit 8C contains cyan developer, and forms a cyan toner image by a developing roller 7C. The developing unit 8K contains black developer, and forms a black toner image by a developing roller 7K.

On the other hand, in parallel to the above-mentioned image forming operation, a sheet S contained in the cassette 2 provided at a lower part of the printer main body 1A is fed by the feed roller 46. After that, the sheet S is conveyed by a conveying roller 4, and when the leading edge of the sheet S is detected by a sensor T1, in synchronization with detection information from the sensor T1, the color toner images on the intermediate transfer belt 11 are collectively transferred by the secondary transfer roller 12 onto the sheet S which has reached a secondary transfer portion.

Subsequently, the sheet S having the color toner images collectively transferred thereto is conveyed to a fixing portion 13. After that, the fixing portion 13 heats and pressurizes the unfixed images thus transferred, to thereby fix the images to the sheet S. Then, the sheet S having the images thus fixed thereto is delivered by a delivery roller 14 from the printer main body 1A onto a delivery tray 1D provided on an upper surface of the printer main body 1A.

Note that, the above-mentioned image forming portion 1B is described by taking as an example an image forming portion configured to form an image on the sheet S by an electrophotographic image forming process. However, the present invention is not limited thereto, and for example, the image forming portion 1B includes an image forming portion configured to form an image on the sheet S by an inkjet image forming process. Further, the structure of the image forming portion 1B is not limited to the above-mentioned structure, and may be selected as appropriate. Still further, the structure of the printer main body 1A is not limited to the above-mentioned structure, and may be selected as appropriate.

Figure 2A:
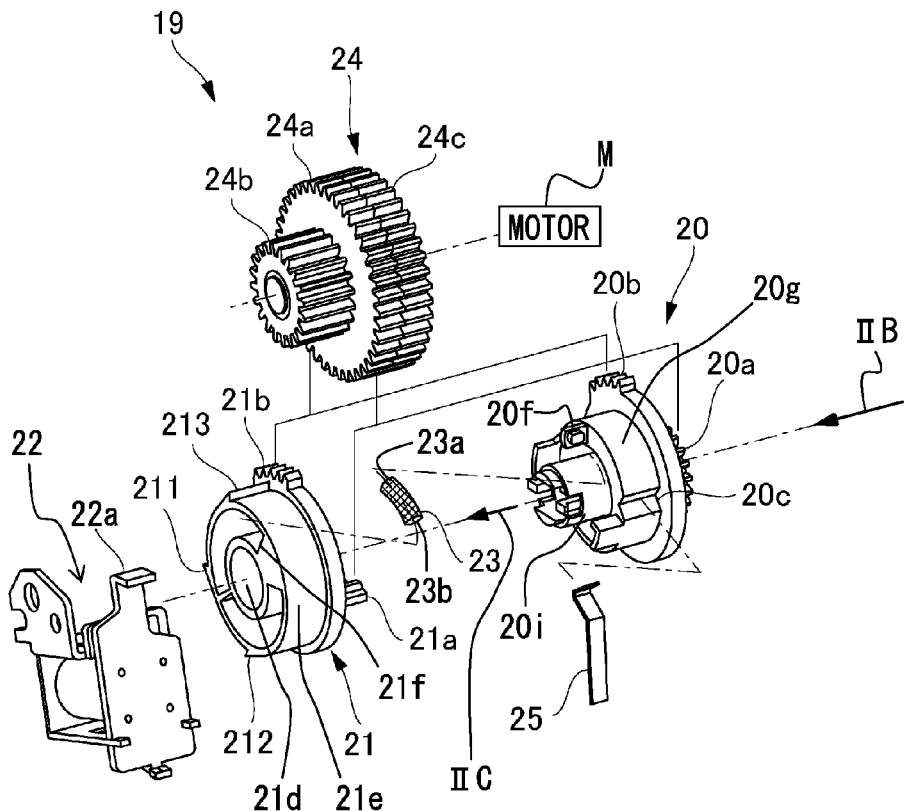
FIGS. 2A, 2B, and 2C are views illustrating a structure of a drive transmission apparatus provided in the color laser printer.

By the way, the rotary developing device 9A is rotationally driven by a drive transmission apparatus 19 illustrated in FIG. 2A.

Figure 2B:
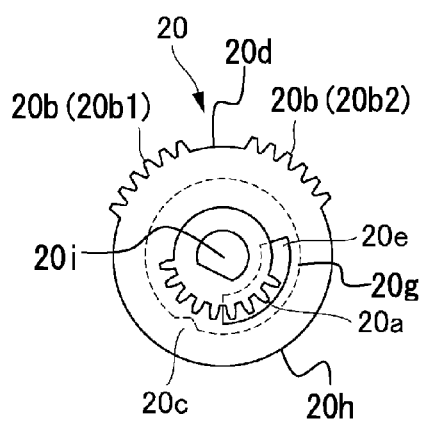
Figure 2C:
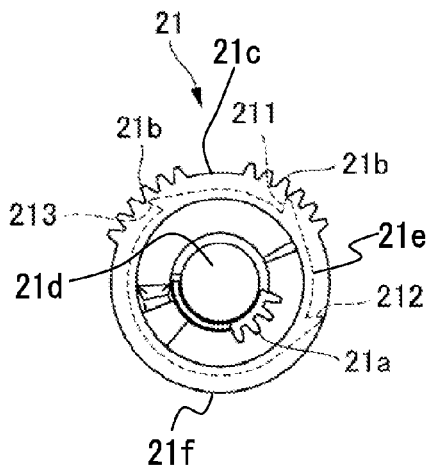

FIG. 2A is an exploded perspective view of the drive transmission apparatus 19 provided in the printer main body 1A. FIG. 2B is a front view of an output gear 20 as viewed along the direction indicated by the arrow IIB in FIG. 2A. FIG. 2C is a front view of a preceding gear 21 as viewed along the direction indicated by the arrow IIC in FIG. 2A. The drive transmission apparatus 19 includes the output gear 20, the preceding gear 21 which is provided coaxially with the output gear 20 and is configured to rotate integrally with the output gear 20, and an input gear 24.

The output gear 20 includes toothless portions 20d and 20h, a small gear portion 20a serving as a first output gear portion, and a large gear portion 20b serving as a second output gear portion. Further, a depressed portion 20c engageable with a latch spring (elastic member) 25 (FIG. 3C) is provided in an outer cylinder portion 20g of the output gear 20. Note that, in the embodiment, the diameter (tip diameter) of the small gear portion 20a is smaller than the diameter (tip diameter) of the large gear portion 20b. Similarly to the output gear 20, the preceding gear 21 includes toothless portions 21c and 21f, a small gear portion 21a serving as a first preceding gear portion, and a large gear portion 21b (toothed portions 21b1 and 21b2) serving as a second preceding gear portion. Further, a depressed portion 21d provided at the center of the preceding gear 21 is fitted onto a projecting portion 20i provided at the center of the output gear 20. Accordingly, the preceding gear 21 is rotatably supported by the output gear 20. Note that, in the embodiment, the diameter of the small gear portion 21a is smaller than the diameter of the large gear portion 21b. Further, the preceding gear 21 includes a circular portion 21e provided coaxially with the depressed portion 21d along an outer periphery of the depressed portion 21d. Further, claw portions 211 to 213 are provided on an outer surface of the circular portion 21e. When each of the claw portions 211 to 213 disengageably engages with an engaging portion 22a of a solenoid 22, the rotation of the preceding gear 21 is regulated and the preceding gear 21 is brought into a stopped state. In other words, in the embodiment, the solenoid 22 (including the engaging portion 22a) serves as a preceding gear regulating portion configured to regulate the rotation of the preceding gear 21. Note that, the gear portion refers to a portion which is provided with teeth (protrusions of the gear). Through the mesh of the teeth, the gear portion transmits a drive force to another gear portion (gear), or receives a drive force transmitted from another gear portion (gear). The gear portion performs the transmission of a drive force or/and the reception of a drive force depending on the role of the gear portion. The toothless portion refers to a portion which is not provided with teeth. Further, the toothless portion is a portion which performs none of the transmission of a drive force and the reception of a drive force.

Further, a compression spring (urging unit, or elastic member) 23 is provided between the output gear 20 and the preceding gear 21 along a rotation direction thereof. In a state in which any one of the claw portions 211 to 213 engages with the engaging portion 22a, that is, under the stopped state of the preceding gear 21, the compression spring 23 is brought into a contracted state. When the engaging claw portion (any one of the claw portions 211 to 213) then disengages from the engaging portion 22a, the stopped state of the preceding gear 21 is canceled. Accordingly, the compression spring 23 is released (changes from the contracted state to the stretched state, that is, generates an elastic force) so that the preceding gear 21 starts to rotate prior to the output gear 20. Note that, the compression spring 23 has one end 23a retained by a retaining portion 20f provided on the output gear 20, and another end 23b retained by a retaining portion 21f provided on the preceding gear 21. Therefore, when the stopped state of the preceding gear 21 is canceled, the retaining portion 21f is urged due to the elastic force of the compression spring 23. Accordingly, the preceding gear 21 starts to rotate. Note that, at this time, the depressed portion 20c is urged due to an elastic force of the latch spring 25, and hence the output gear 20 is maintained in the immobilized state.

The input gear 24 includes a large gear portion 24a serving as a first drive gear portion, and a small gear portion 24b serving as a second drive gear portion. The input gear 24 is driven due to a drive force from a motor (drive source) M (FIG. 2A) to rotate at a constant angular velocity. Note that, in the embodiment, the diameter of the large gear portion 24a is larger than the diameter of the small gear portion 24b. The large gear portion 24a is a gear with 40 teeth, which meshes with the small gear portion (output small gear portion) 20a of the output gear 20 and the small gear portion (preceding small gear portion) 21a of the preceding gear 21. The small gear portion 24b is a gear with 20 teeth, which meshes with the large gear portion (hereinafter referred to as "output large gear portion") 20b of the output gear 20 and the large gear portion (hereinafter referred to as "preceding large gear portion") 21b of the preceding gear 21. Further, the input gear 24 includes a gear portion 24c coupled to the motor M. Note that, the gear portion 24c is juxtaposed to the large gear portion 24a at a position on the outer side of the large gear portion 24a. Further, the gear portion 24c has the same tip diameter and the same number of teeth as the large gear portion 24a. Note that, the rotational drive force from the motor M is transmitted to the input gear 24 directly or via a gear, a toothed belt, or the like.

The large gear portion 20b includes two toothed portions 20b1 and 20b2. The outer diameter (tip diameter) of the large gear portion 20b corresponds to 40 teeth. The outer diameter (tip diameter) of the small gear portion 20a corresponds to 20 teeth (see FIG. 2B). Note that, in FIG. 2B, the output gear 20 has an opening portion 20e formed into an arc shape. When the preceding gear 21 is built into the output gear 20, the small gear portion 21a of the preceding gear 21 protrudes through the opening portion 20e. Accordingly, the small gear portion 21a can mesh with the large gear portion (input large gear portion) 24a. Further, the large gear portion 21b has the same number of teeth as the large gear portion 20b, and the small gear portion 21a has the same number of teeth as the small gear portion 20a (see FIG. 2A).

Next, a drive force transmission operation of the drive transmission apparatus 19 will be described with reference to FIGS. 3A to 8B. FIGS. 3A, 3B, 4A, 4B, 5A, 5B, 6A, 6B, 7A, 7B, and 8A are views illustrating the preceding gear 21. FIGS. 3C, 3D, 4C, 4D, 5C, 5D, 6C, 6D, 7C, 7D, and 8B are views illustrating the output gear 20 corresponding to FIGS. 3A, 3B, 4A, 4B, 5A, 5B, 6A, 6B, 7A, 7B, and 8A, respectively. Further, the toothed portions of the preceding gear 21 are hatched to indicate operation positions thereof.

Under the initial state of the drive transmission apparatus 19, the claw portion 211 of the preceding gear 21 engages with the engaging portion 22a of the solenoid 22 (FIG. 3A). Further, the depressed portion 20c of the output gear 20 engages with the latch spring (elastic member, or output gear immobilizing unit) 25. In other words, the output gear 20 and the preceding gear 21 are stopped. At this time, the output gear 20 and the preceding gear 21 are stopped with their toothless portions 20d and 21c opposed to the input gear 24 which rotates at a constant velocity in the direction indicated by the arrow A (FIGS. 3A and 3C).

When the solenoid 22 is then turned ON at a predetermined timing, the engaging portion 22a disengages from the claw portion 211. In other words, the stopped state of the preceding gear 21 which is achieved by the solenoid 22 is canceled. When the stopped state of the preceding gear 21 is canceled, due to the elastic force of the compression spring (elastic member, or urging member) 23, the preceding gear 21 rotates in the direction indicated by the arrow B (FIG. 3A) so as to mesh with the input gear 24. Accordingly, the large gear portion 21*b* starts to mesh with the small gear portion 24*b* (FIG. 3B). In this manner, the preceding gear 21 starts to rotate. At this time, the depressed portion 20*c* of the output gear 20 is urged due to the elastic force of the latch spring 25, and hence the output gear 20 is maintained in the stopped state (FIGS. 3C and 3D). In other words, the latch spring 25 is fitted into the depressed portion 20*c*.

Subsequently, the preceding gear 21 rotates by a predetermined amount, and a coupling rib (coupling portion) 214 provided in the preceding gear 21 abuts against a coupling rib (coupling portion) 201 provided in the output gear 20 (FIG. 4A). Accordingly, the output gear 20 starts to rotate integrally with the preceding gear 21 (in the direction indicated by the arrow B in FIG. 4C) against the elastic force (latching force) of the latch spring 25. In the state in which the coupling rib 214 abuts against the coupling rib 201, the large gear portion 20*b* starts to mesh with the small gear portion 24*b* while adjusting the phase of the large gear portion 20*b* to the phase of the large gear portion 21*b*. This is because the gear pitches of the large gear portion 21*b* and the large gear portion 20*b* are equal to each other.

As described above, in the embodiment, through the abutment between the coupling rib (interlocking portion) 214 and the coupling rib (interlocking portion) 201, the output gear 20 rotates in association with the rotation of the preceding gear 21 in a direction in which the output gear 20 meshes with the input gear 24. In other words, in the embodiment, the interlocking portion comprises the coupling ribs 214 and 201. When the toothed portion 21*b*1 (21*b*2) of the large gear portion 21*b* then terminates the meshing relationship with the small gear portion 24*b*, the solenoid 22 is turned OFF at this time (FIG. 4B). Accordingly, the claw portion 212 is latched by the engaging portion 22*a* so that the rotation of the preceding gear 21 is stopped.

On the other hand, even when the preceding gear 21 is brought into the stopped state, the output gear 20 which is already in the meshed state with the small gear portion 24*b* continues to rotate (FIGS. 4D and 5C). Therefore, the compression spring 23 provided between the preceding gear 21 and the output gear 20 is contracted (FIG. 5A). Subsequently, at a timing when the toothed portion 20*b*1 of the large gear portion 20*b* terminates the meshing relationship with the small gear portion 24*b*, the solenoid 22 is turned ON again, and the claw portion 212 is unlatched (FIG. 5B). Accordingly, the contracted compression spring 23 is released, and the preceding gear 21 starts to rotate again in the direction indicated by the arrow B in FIG. 5B. Along with this, the small gear portion 21*a* starts to mesh with the large gear portion 24*a*, and the output gear 20 starts to rotate in the direction indicated by the arrow B in FIG. 5D through the drive transmitted from the input gear 24.

Figure 6C:
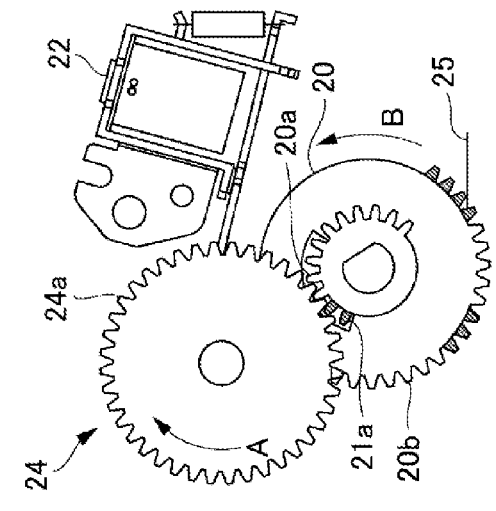
FIGS. 6A, 6B, 6C, and 6D are explanatory views illustrating the drive transmission operation of the drive transmission apparatus.
Figure 6D:
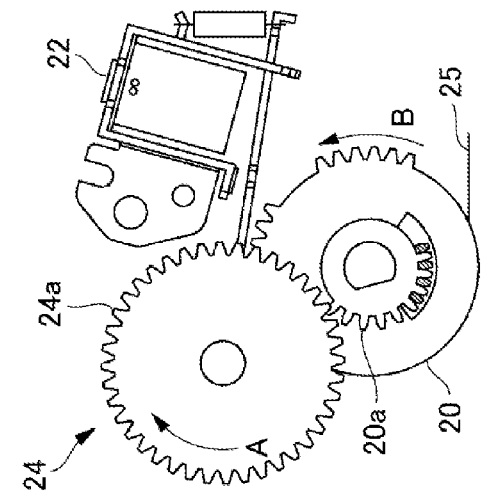
Figure 6A:
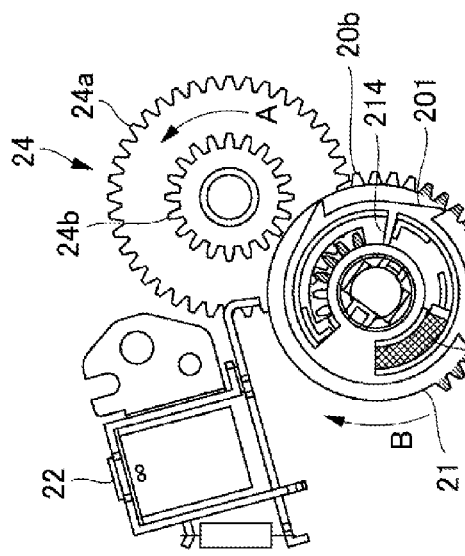

Subsequently, after the large gear portion 20*b* terminates the meshing relationship with the small gear portion 24*b*, the coupling rib 214 abuts against the coupling rib 201 again (FIG. 6A). Accordingly, the small gear portion 20*a* starts to mesh with the large gear portion 24*a*, and thus the output gear 20 starts to rotate (FIG. 6C). In the state in which the coupling rib 214 abuts against the coupling rib 201, the small gear portion 20*a* starts to mesh with the large gear portion 24*a* while adjusting the phase of the small gear portion 20*a* to the phase of the large gear portion 24*a*. Accordingly, the preceding gear 21 also starts to rotate. This is because the gear pitches the small gear portion 21*a* and the small gear portion 20*a* are equal to each other.

Figure 6B:
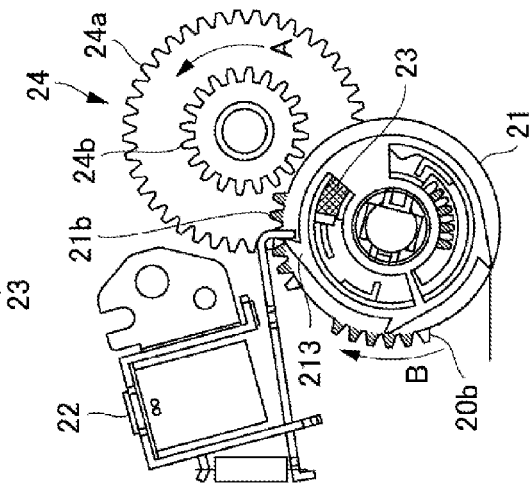

After that, the preceding gear 21 terminates the meshing relationship with the input gear 24. However, the output gear 20 is rotated by the input gear 24, and hence the output gear 20 exerts a rotational force on the preceding gear 21 via the compression spring 23. Accordingly, the preceding gear 21 rotates in the direction indicated by the arrow B in FIG. 6A. The preceding gear 21 continues to rotate until the claw portion 213 is latched by the solenoid 22 (engaging portion 22*a*) in the OFF state (FIG. 6B).

Figure 7C:
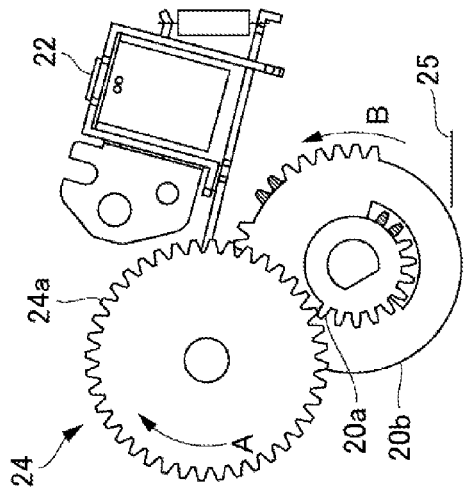
FIGS. 7A, 7B, 7C, and 7D are explanatory views illustrating the drive transmission operation of the drive transmission apparatus.
Figure 7D:
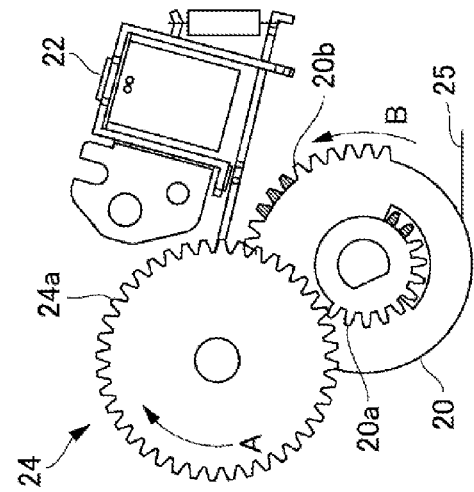
Figure 7A:
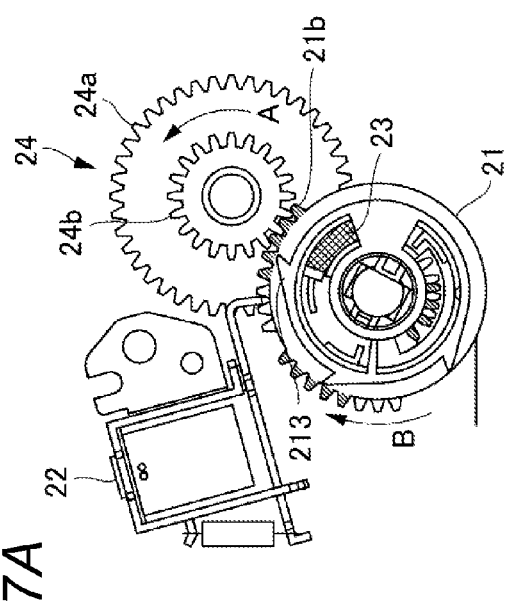
Figure 7B:
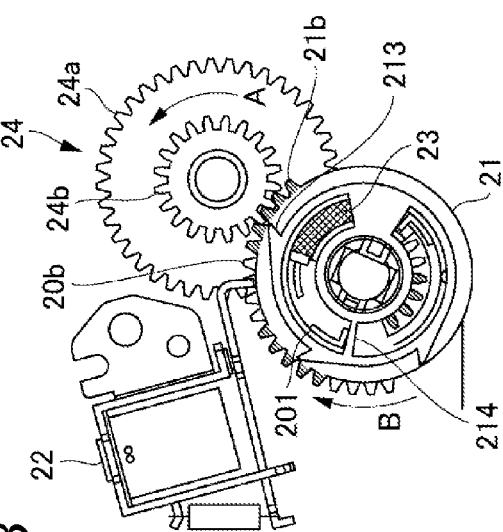

Subsequently, when the small gear portion 20*a* terminates the meshing relationship with the large gear portion 24*a* (FIG. 6D), the solenoid 22 is turned ON once again. Accordingly, the preceding gear 21 starts to rotate due to the contracted compression spring 23. Then, the large gear portion 21*b* starts to mesh with the small gear portion 24*b*, and thus the preceding gear 21 starts to rotate through the drive transmitted from the input gear 24 (FIG. 7A). When the small gear portion 20*a* terminates the meshing relationship with the large gear portion 24*a*, the coupling rib 214 then abuts against the coupling rib 201 once again (FIG. 7B). Accordingly, the large gear portion 20*b* starts to mesh with the small gear portion 24*b* (FIG. 7B). As a result, the output gear 20 starts to rotate in the direction indicated by the arrow B in FIG. 7D.

Figure 8A:
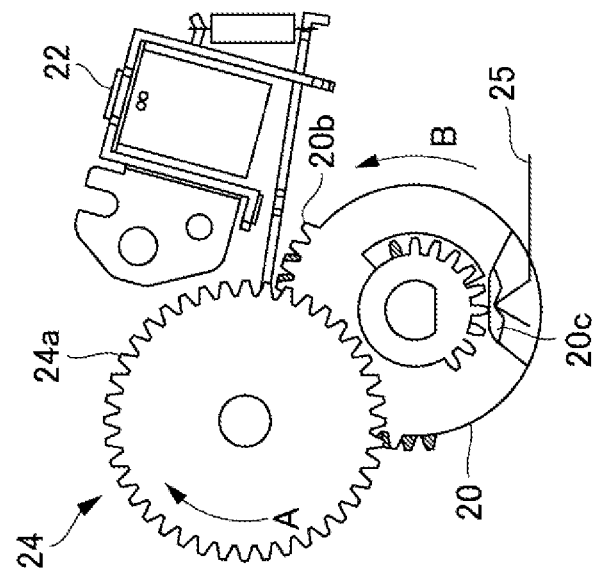
FIGS. 8A and 8B are explanatory views illustrating the drive transmission operation of the drive transmission apparatus.
Figure 8B:
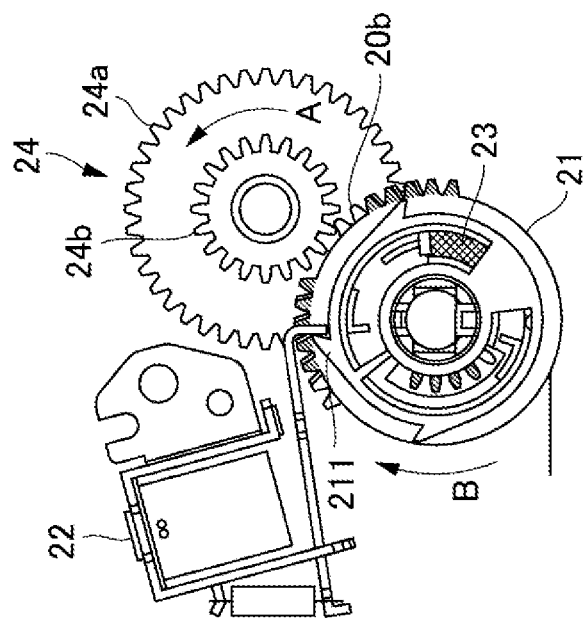
Figure 20:
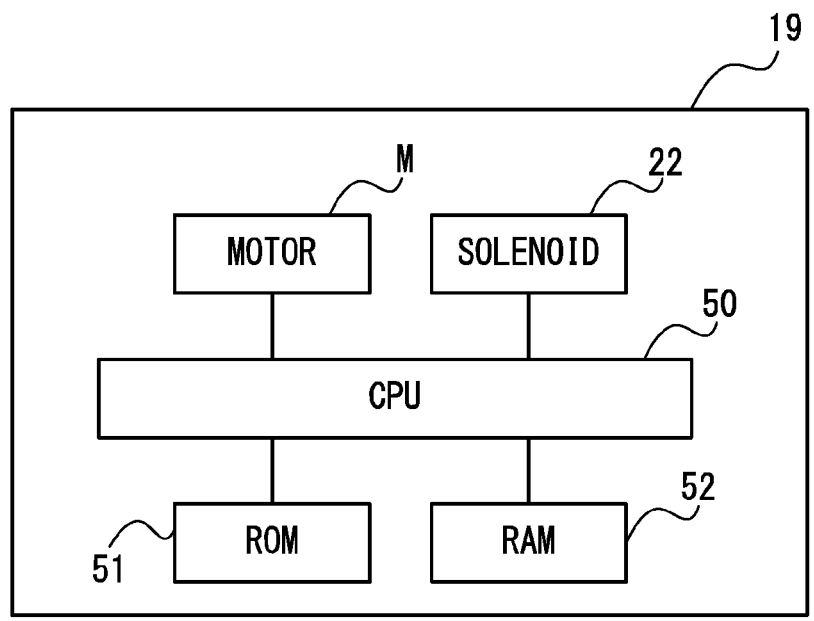
FIG. 20 is a block diagram of the drive transmission apparatus to which the present invention is applied.
Figure 21:
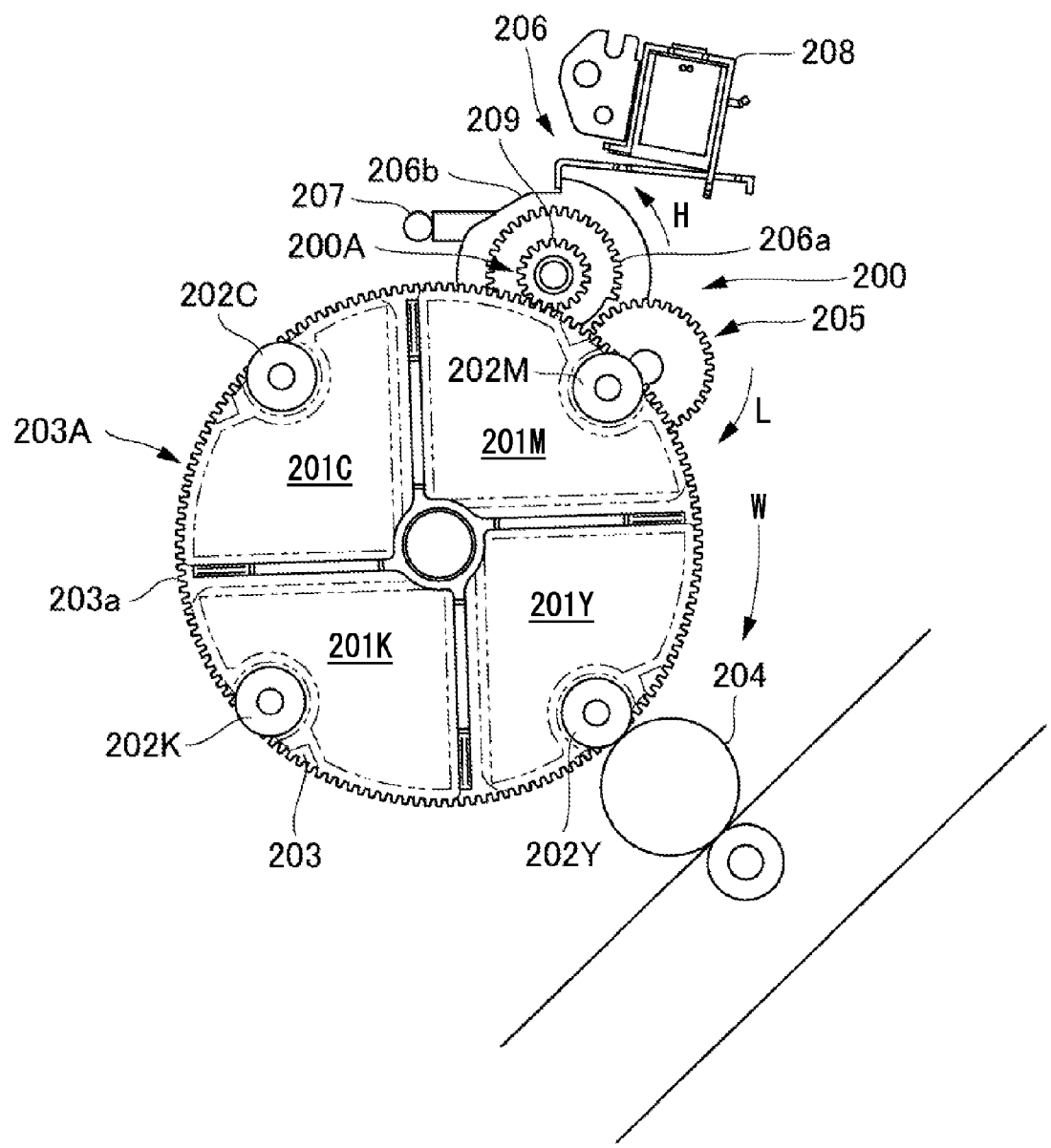
FIG. 21 is a view illustrating a structure of a rotary developing device which is configured to receive drive transmitted by a conventional drive transmission apparatus.
Figure 22:
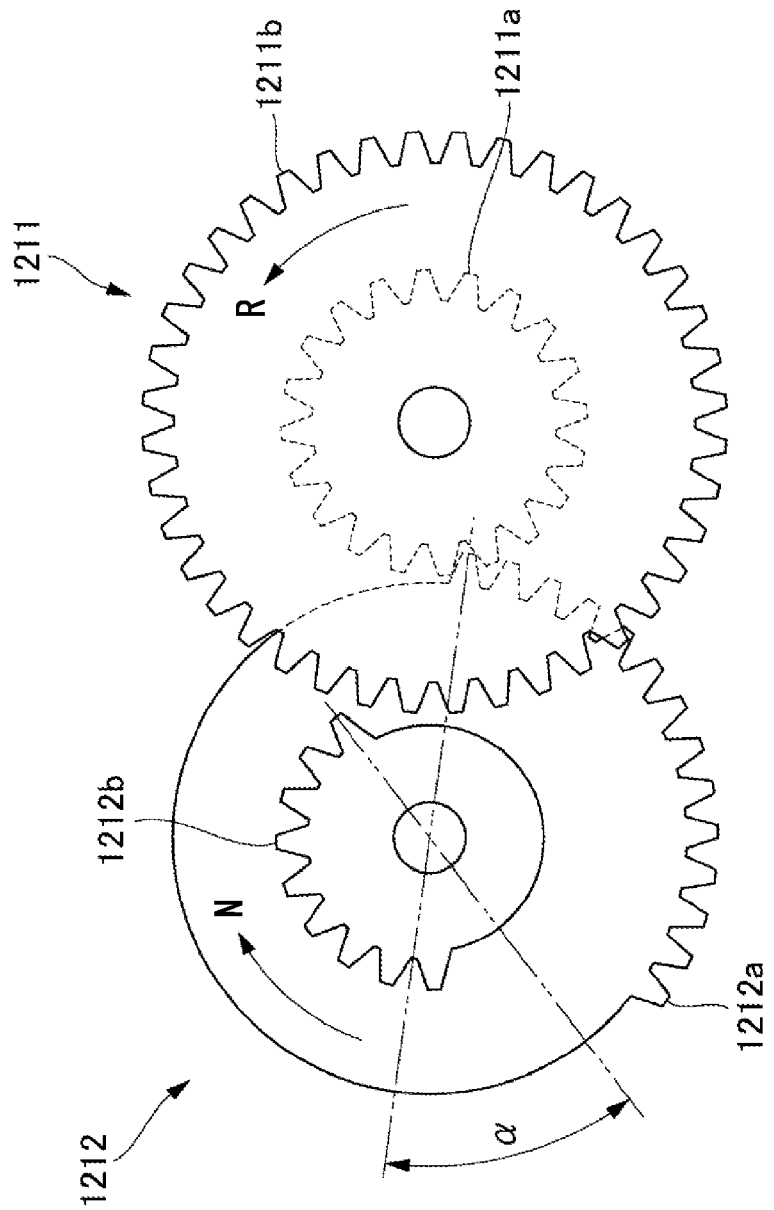
FIG. 22 is a view illustrating another structure of the conventional drive transmission apparatus.

Subsequently, the preceding gear 21 terminating the meshing relationship with the input gear 24 rotates due to the rotational force received via the compression spring 23, and the claw portion 211 is latched by the solenoid 22 so that the preceding gear 21 returns to the initial state (FIG. 8A). On the other hand, the large gear portion 20*b* terminates the meshing relationship with the small gear portion 24*b*. Then, due to the elastic force of the latch spring 25 which abuts against the depressed portion 20*c* of the output gear 20, the output gear 20 rotates in the direction indicated by the arrow B in FIGS. 8A and 8B, and returns to the initial state as well. Note that, the ON/OFF control of the solenoid 22 is performed in response to a signal from a CPU 50 serving as a control portion. FIG. 20 is a block diagram of the drive transmission apparatus 19. As illustrated in FIG. 20, the CPU 50 is connected to the motor M and the solenoid 22. Further, the CPU 50 is connected to a ROM 51 and a RAM 52. The CPU 50 uses the RAM 52 as a work memory to execute a program stored in the ROM 51.

Figure 9:
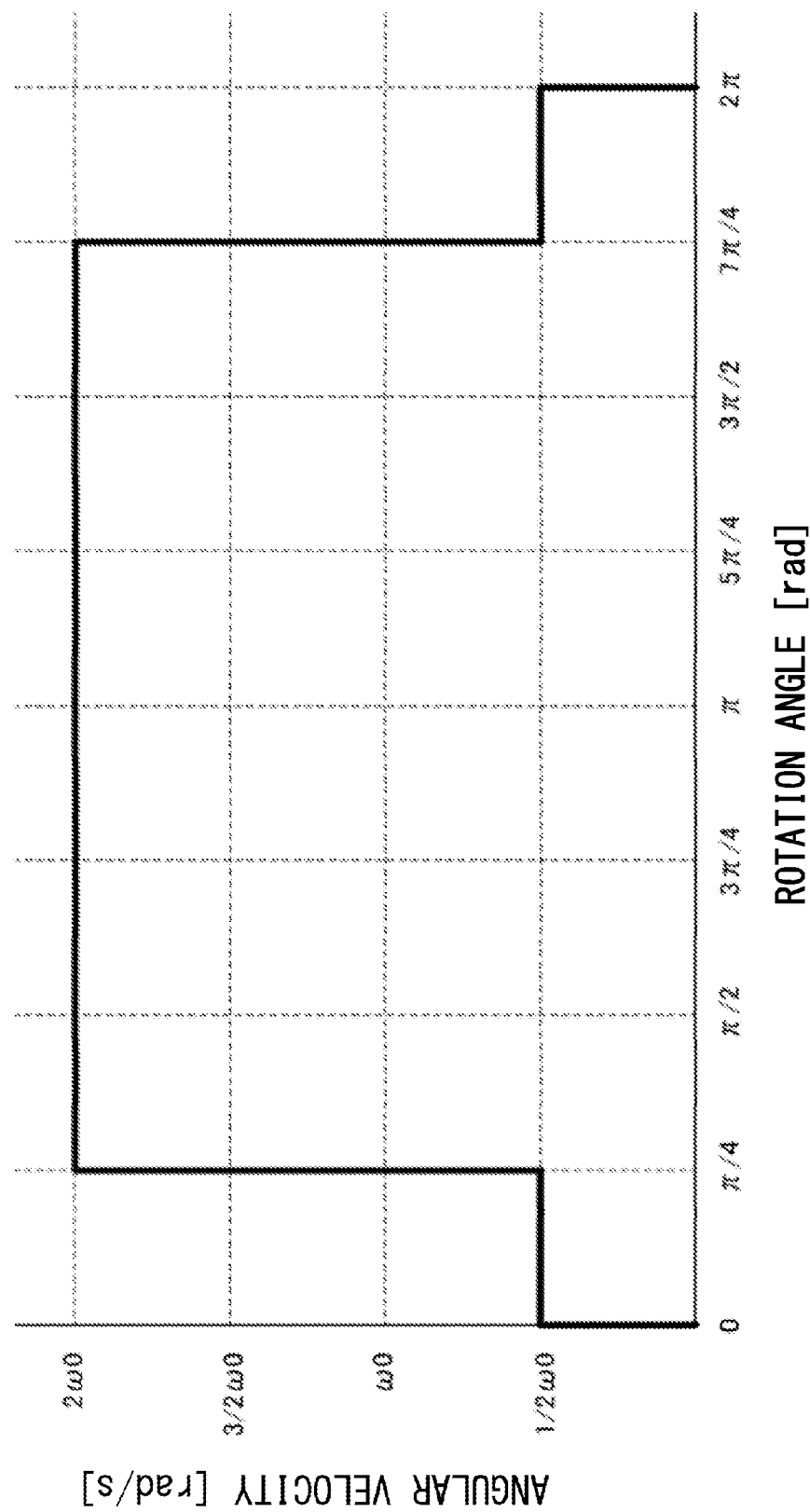
FIG. 9 is a graph showing a relationship between a rotation angle and an angular velocity of an output gear of the drive transmission apparatus.

FIG. 9 is a graph showing a relationship between a rotation angle and an angular velocity of the output gear 20 of the drive transmission apparatus 19. In FIG. 9, an angular velocity $\omega 0$ indicates an angular velocity of the input gear 24. When the large gear portion 20*b* meshes with the small gear portion 24*b*, the angular velocity of the output gear 20 is $\frac{1}{2}\omega 0$ based on the above-mentioned gear ratio. When the small gear portion 20*a* meshes with the large gear portion 24*a*, the angular velocity of the output gear 20 is $2\omega 0$. Further, as described above, the large gear portion 20*b* includes the two toothed portions 20*b*1 and 20*b*2. Therefore, the angular velocity of the output gear 20 is $\frac{1}{2}\omega 0$ at the start and the end of the rotation thereof.

As described above, the drive transmission apparatus 19 according to the embodiment can rotate the output gear 20 at a first velocity as a low velocity only at the start and the end of the rotation of the output gear 20. In other words, the drive transmission apparatus 19 can rotate the output gear 20 at a relatively low velocity during those periods. Further, the drive transmission apparatus 19 can rotate the output gear 20 at a second velocity higher than the first velocity during a period other than the start and the end of the rotation. In other words, the drive transmission apparatus 19 can rotate the output gear 20 at a relatively high velocity during this period. Thus, when the drive transmission apparatus 19 is applied to the rotary developing device 9A, the following effect can be obtained. Specifically, when the photosensitive drum 5 and each of the developing rollers 7Y, 7M, 7C, and 7K come into contact with each other so as to develop the electrostatic latent images, impact occurring at the time of contact can further be suppressed as compared to the case where the output gear 20 is rotated at the second velocity. Thus, when the photosensitive drum 5 and each of the developing rollers 7Y, 7M, 7C, and 7K come into contact with each other, vibration and impact sound can be suppressed. Further, when the drive transmission apparatus 19 is applied to the sheet feed device 1C, the following effect can be obtained. Specifically, when rotatable feed members 41 in a feed operation come into contact with the sheet S stacked on a sheet stacking plate 42, the contact can be performed more softly as compared to the case where the output gear 20 is rotated at the second velocity. Thus, when the rotatable feed members 41 come into contact with the sheet S, vibration and impact sound can be suppressed.

Figure 10:
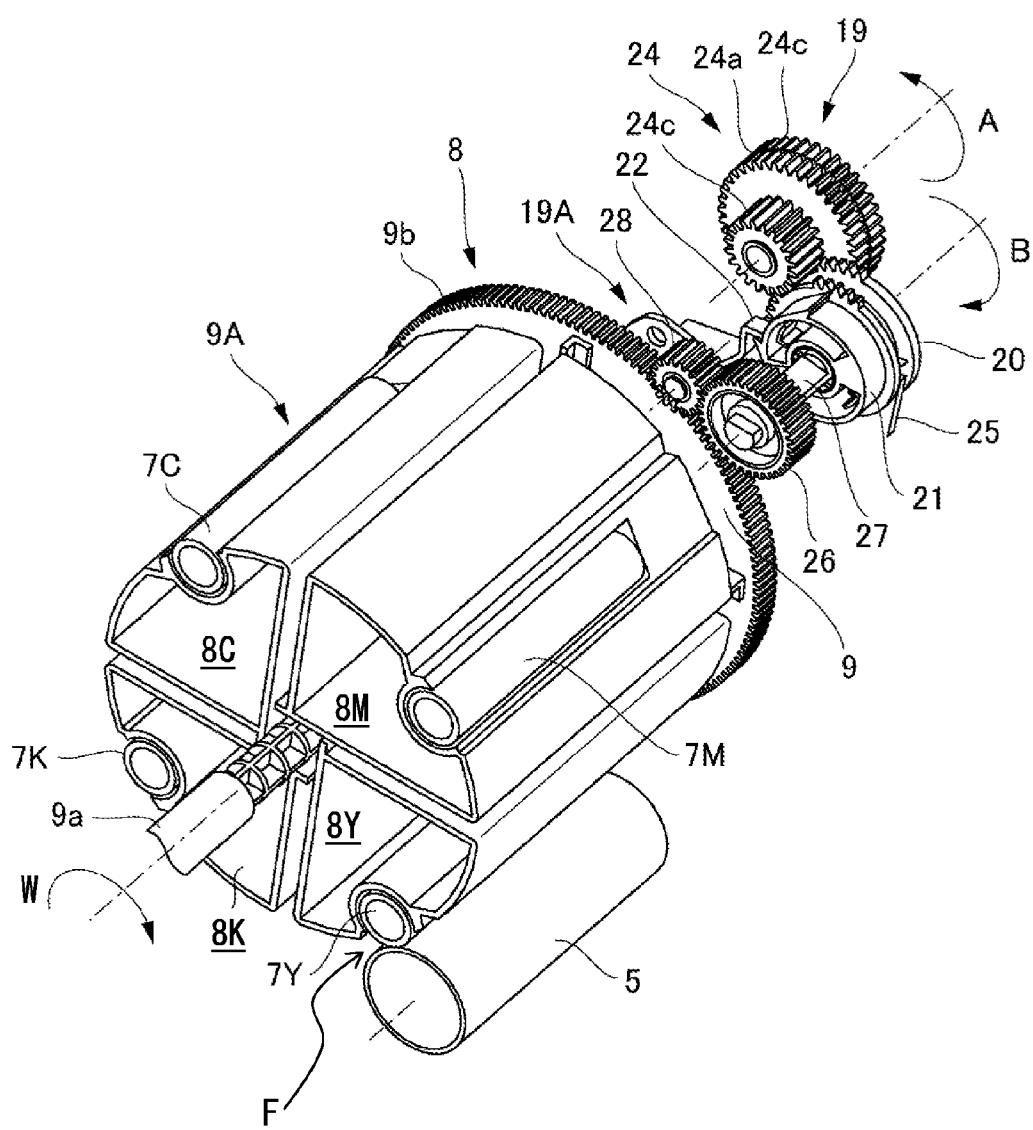
FIG. 10 is an explanatory view illustrating a rotary developing device provided with the drive transmission apparatus.

By the way, in the embodiment, as described above, the drive transmission apparatus 19 is used for controlling the rotation of the rotary developing device 9A. FIG. 10 is a view illustrating the drive transmission apparatus 19 provided on the rotary developing device 9A. The drive transmission apparatus 19 is arranged on a side end portion of the rotary developing device 9A, and the output gear 20 transmits a drive force to a second output gear 26 via an output shaft 27. The second output gear 26 is connected, through an intermediation of a rotary holder drive gear 28, to a rotary holder gear 9b provided at an end portion of the rotary holder 9 in a longitudinal direction thereof. Accordingly, the rotary holder 9 rotates about a rotation shaft 9a. Note that, the second output gear 26, the rotary holder drive gear 28, and the rotary holder gear 9b constitute a development switching mechanism 19A configured to switch the developing rollers (developing units) 7Y, 7M, 7C, and 7K of the rotary developing device 9A to be used.

With this structure, when the input gear 24 is rotationally driven by the motor M in the direction indicated by the arrow A in FIG. 10, the output gear 20 and the second output gear 26 rotate in the direction indicated by the arrow B in FIG. 10, and the rotary holder 9 rotates in the direction indicated by the arrow W in FIG. 10. Note that, in the embodiment, the second output gear 26 has 38 teeth, the rotary holder drive gear 28 has 19 teeth, and the rotary holder gear 9b has 152 teeth.

Thus, when the output gear 20 performs one revolution, the rotary holder drive gear 28 performs two revolutions, and the rotary holder 9 performs a quarter revolution. Accordingly, as illustrated in, for example, FIG. 10 (FIG. 1), the yellow developing roller 7Y comes into a state of being located at a developing position F. When the development process of yellow is finished, the rotary holder 9 performs a quarter revolution through the above-mentioned series of operations of the solenoid 22. As a result, the magenta developing roller 7M moves to the developing position F. In this manner, every time the development process of each color is finished, the rotary holder 9 is caused to perform a quarter revolution. Accordingly, the developing rollers 7Y, 7M, 7C, and 7K of the respective colors can be moved sequentially to the developing position F (FIGS. 1 and 10).

On the other hand, as described above, the drive transmission apparatus 19 according to the embodiment can rotate the rotary holder 9 at a low velocity only at the start and the end of the rotation of the output gear 20 (FIG. 9). Specifically, in the operation of switching the developing rollers, the angular velocity of the rotary holder 9 at the time of separation of the preceding developing roller from the photosensitive drum 5 can be reduced, and the angular velocity of the rotary holder 9 at the time of abutment of the succeeding developing roller against the photosensitive drum 5 can be reduced. For example, in FIG. 10 (FIG. 1), the angular velocity of the rotary holder 9 at the time of separation of the preceding developing roller 7Y from the photosensitive drum 5 can be reduced, and the angular velocity of the rotary holder 9 at the time of abutment of the succeeding developing roller 7M against the photosensitive drum 5 can be reduced. As a result, even when the switching speed of the developing rollers (developing units) 7Y, 7M, 7C, and 7K is increased along with the increase in operation speed of the color laser printer (image forming apparatus) 1, the rotary holder 9 can be rotated at the low velocity only at the time of abutment and separation. Accordingly, vibration and impact sound of the image forming apparatus can be suppressed. Specifically, the developing roller 7Y can be separated from the photosensitive drum 5 smoothly (softly). Further, the developing roller 7M can be brought into contact with the photosensitive drum 5 smoothly (softly). Thus, when the developing roller 7Y is separated from the photosensitive drum 5, the vibration of the rotary developing device 9A can be suppressed. Further, the impact sound can be suppressed. Similarly, when the developing roller 7M is brought into contact with the photosensitive drum 5, the vibration of the rotary developing device 9A can be suppressed. Further, the impact sound can be suppressed.

As described above, the drive transmission apparatus 19 according to the embodiment can rotate the output gear 20 at low velocity by causing the output gear 20 to interlock with the preceding gear 21 which starts to rotate through the cancellation of its stopped state. Further, when the output gear 20 rotates by a predetermined amount, the drive transmission apparatus 19 can rotate the output gear 20 at a high velocity. Accordingly, for example, when the drive transmission apparatus 19 is used for controlling the rotation of the rotary developing device 9A, the vibration and impact sound of the rotary developing device 9A can be suppressed. Further, smooth drive force transmission can be performed.

Figure 11A:
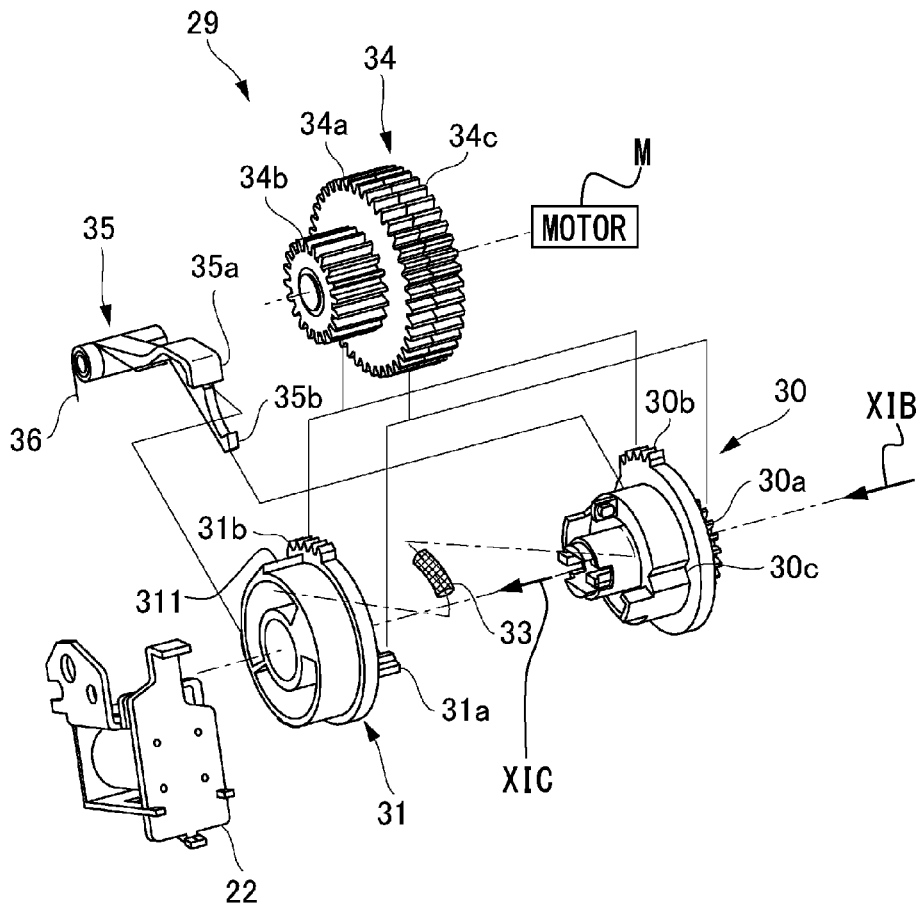
FIGS. 11A, 11B, and 11C are views illustrating a structure of a drive transmission apparatus provided in the image forming apparatus according to a second embodiment of the present invention.
Figure 11B:
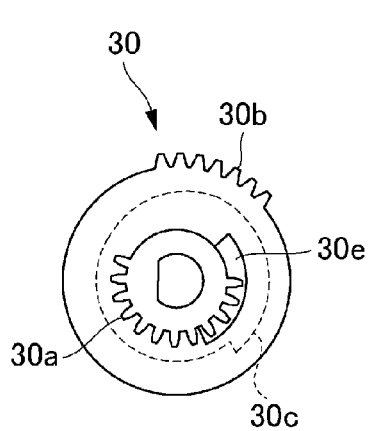
Figure 11C:
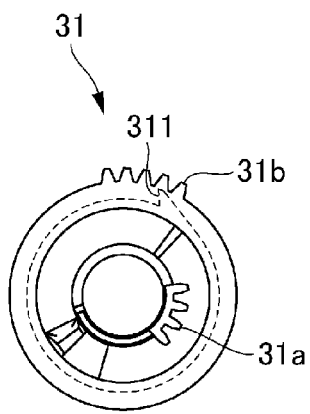

Next, a second embodiment of the present invention will be described. FIG. 11A is an exploded perspective view of a drive transmission apparatus provided in the color laser printer (image forming apparatus) 1 according to the embodiment. FIG. 11B is a front view of an output gear 30 as viewed along the direction indicated by the arrow XIB in FIG. 11A. FIG. 11C is a front view of a preceding gear 31 as viewed along the direction indicated by the arrow XIC in FIG. 11A.

In FIG. 11A, a drive transmission apparatus 29 includes the output gear 30, the preceding gear 31, and an input gear 34. The output gear 30 includes a partially-toothless small gear portion 30a having a toothless portion, and a partially-toothless large gear portion 30b having a toothless portion. Further, a cam surface 30c is provided on an outer peripheral surface of the output gear 30. Still further, a latch arm 35 is a latch member. The latch arm 35 latches the preceding gear 31 to maintain the preceding gear 31 in a stopped state. The latch arm 35 includes a latch piece 35a, and a cam follower 35b to be brought into abutment against the cam surface 30c.

Similarly to the output gear 30, the preceding gear 31 includes a preceding small gear portion 31a and a preceding large gear portion 31b which have toothless portions. The preceding gear 31 is rotatably held by the output gear 30. Further, the preceding gear 31 includes a claw portion 311 provided as a portion to be latched. When the claw portion 311 engages with the solenoid 22 or the latch piece 35a of the latch arm 35 that is a latch portion, the preceding gear 31 is brought into the stopped state.

As described above, in the embodiment, the claw portion (to be latched) 311 and the latch arm 35 constitute a preceding gear stopping portion configured to maintain the preceding gear 31 in the stopped state. Note that, unlike the first embodiment described above, the claw portion 311 of the embodiment is provided at one position on an outer peripheral surface of the preceding gear 31. Further, a compression spring (elastic member) 33 is provided between the output gear 30 and the preceding gear 31. Accordingly, when the stopped state of the preceding gear 31 is canceled, the compression spring 33 is released to generate an elastic force so that the preceding gear 31 rotates prior to the output gear 30. Note that, the stopped state of the preceding gear 31 is canceled when the solenoid 22 or the latch piece 35a disengages from the claw portion 311.

The input gear 34 is driven by the drive force from the motor M to rotate at a constant velocity. The input gear 34 includes a large gear portion 34a which meshes with the partially-toothless small gear portion 30a and the preceding small gear portion 31a, and a small gear portion 34b which meshes with the partially-toothless large gear portion 30b and the preceding large gear portion 31b. Further, the input gear 34 includes a gear portion 34c drivingly coupled to the motor M. Note that, the large gear portion 34a has 40 teeth and the small gear portion 34b has 20 teeth.

As illustrated in FIG. 11B, the outer diameter of the partially-toothless large gear portion 30b corresponds to 40 teeth, and the outer diameter of the partially-toothless small gear portion 30a corresponds to 20 teeth. Note that, in FIG. 11B, the output gear 30 has an opening portion 30e formed into an arc shape. When the preceding gear 31 is built into the output gear 30, the preceding small gear portion 31a protrudes through the opening portion 30e.

Next, a drive force transmission operation of the drive transmission apparatus 29 will be described with reference to FIGS. 12A to 16. FIGS. 12A, 12B, 13A, 13B, 14A, 14B, and 15A are views illustrating the preceding gear 31. FIGS. 12C, 12D, 13C, 13D, 14C, 14D, and 15B are views illustrating the output gear 30 corresponding to FIGS. 12A, 12B, 13A, 13B, 14A, 14B and 15A, respectively. Further, the toothed portions of the preceding gear 31 are hatched to indicate operation positions thereof.

Figure 12A:
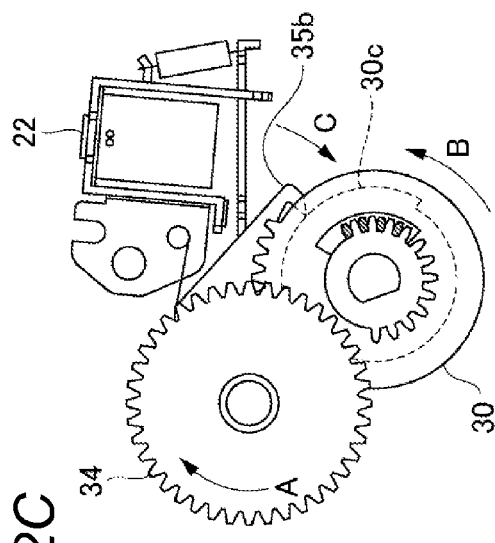
FIGS. 12A, 12B, 12C, and 12D are explanatory views illustrating a drive transmission operation of the drive transmission apparatus.
Figure 12C:
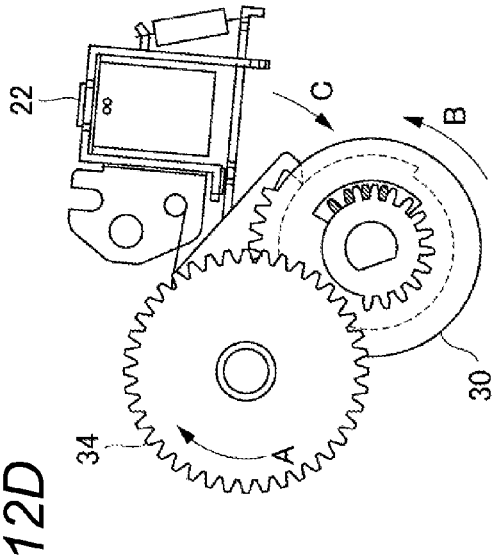

In the initial state of the drive transmission apparatus 29, as illustrated in FIG. 12A, the claw portion 311 of the preceding gear 31 engages with the solenoid 22 and the preceding gear 31 is stopped with its toothless portion opposed to the input gear 34 which rotates at a constant velocity in the direction indicated by the arrow A in FIG. 12A. Similarly to the preceding gear 31, the output gear 30 is in a stopped state by a latch unit (described later) (FIG. 12C). On the other hand, the latch arm 35 is urged in the direction indicated by the arrow C in FIGS. 12A and 12C due to an elastic force of an arm spring (elastic member) 36 so that the cam follower 35b abuts against the cam surface 30c of the output gear 30 (FIG. 12C).

Figure 12B:
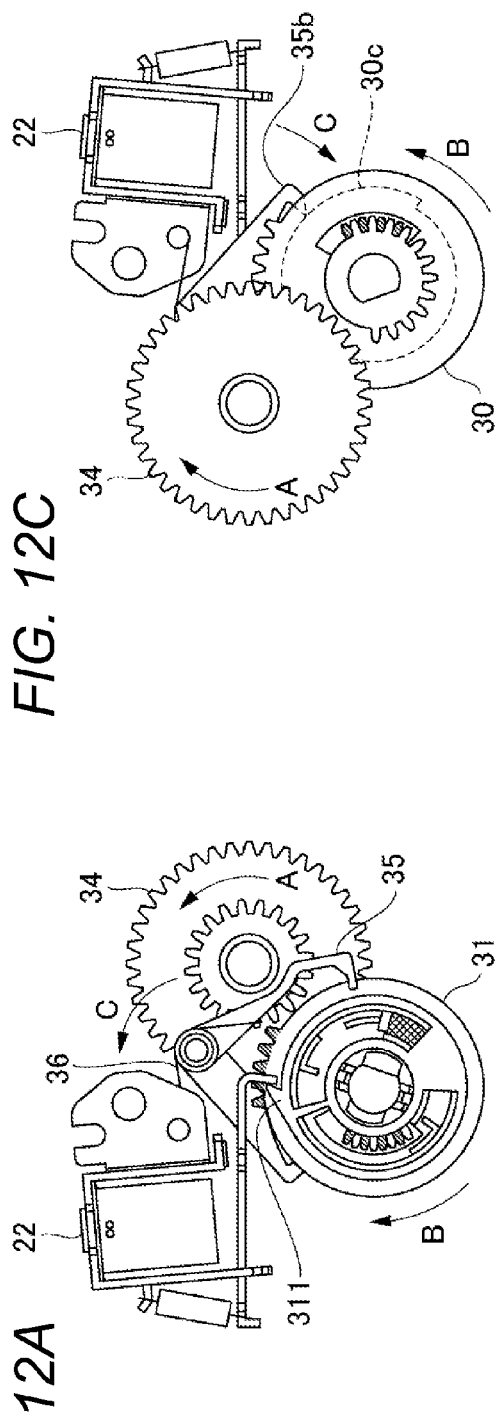
Figure 12D:
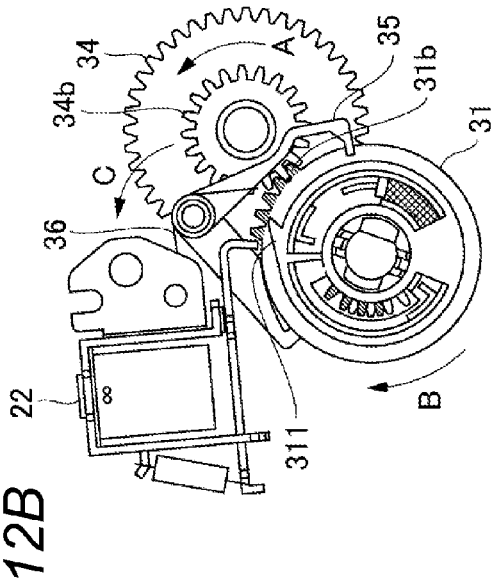

Then, the solenoid 22 is turned ON at a predetermined timing, and the claw portion 311 is unlatched (FIG. 12B). Then, the preceding gear 31 rotates in the direction indicated by the arrow B in FIG. 12B due to the elastic force of the compression spring (elastic member) 33. Accordingly, the preceding large gear portion 31b starts to mesh with the small gear portion 34b. At this time, the output gear 30 is maintained in the stopped state by the latch unit described later (FIG. 12D).

Figure 13C:
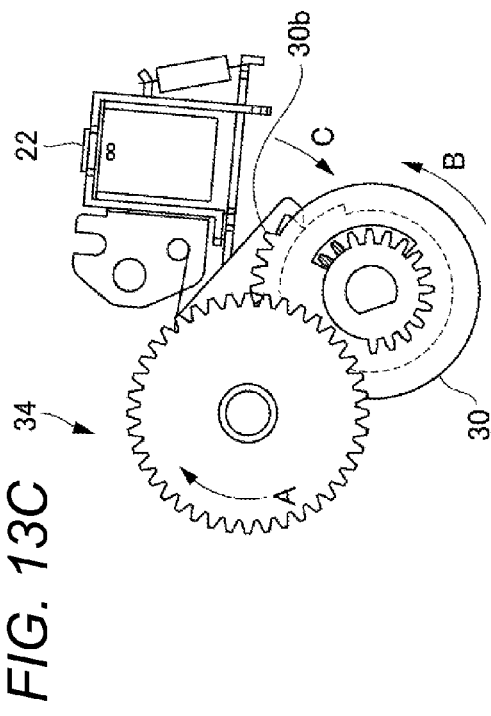
FIGS. 13A, 13B, 13C, and 13D are explanatory views illustrating the drive transmission operation of the drive transmission apparatus.
Figure 13D:
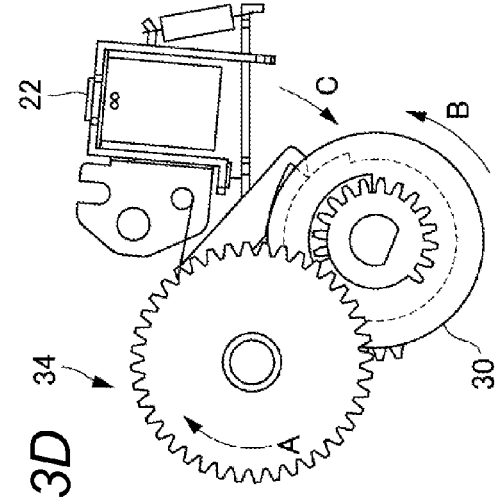
Figure 13A:
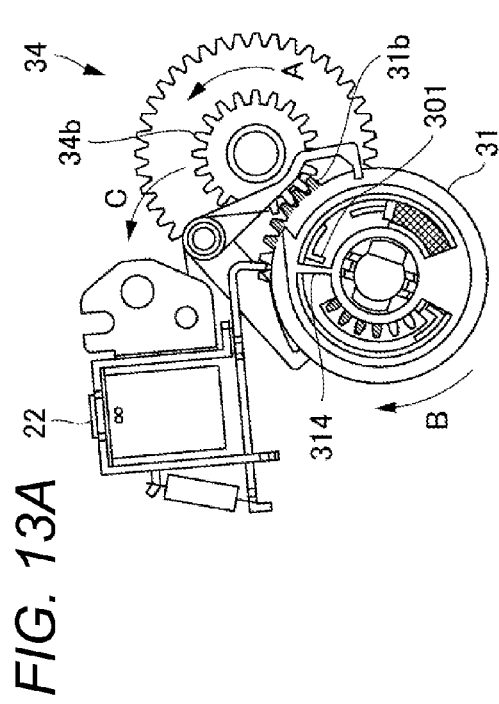

Subsequently, the preceding gear 31 rotates by a predetermined amount due to the elastic force of the compression spring 33, and a coupling rib 314 of the preceding gear 31 abuts against a coupling rib 301 of the output gear 30 (FIG. 13A). Then, the output gear 30 starts to rotate in the direction indicated by the arrow B in FIG. 13C against a latching force of the latch unit described later. In the state in which the coupling rib (coupling portion) 314 abuts against the coupling rib (coupling portion) 301, the gear pitches and the phases of the preceding large gear portion 31b and the partially-toothless large gear portion 30b are equal to each other, and hence the partially-toothless large gear portion 30b starts to mesh with the small gear portion 34b.

Figure 13B:
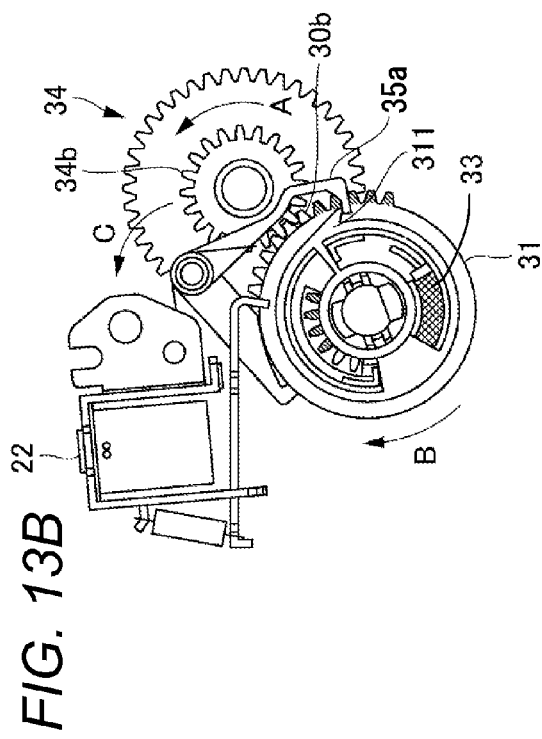

When the toothed portion of the preceding large gear portion 31b then terminates the meshing relationship with the small gear portion 34b, the claw portion 311 is latched by the latch piece 35a (FIG. 13B). Accordingly, the preceding gear 31 is brought into the stopped state. On the other hand, the output gear 30 that is already in the meshed state with the small gear portion 34b continues to rotate (FIGS. 13B and 13D). Therefore, the compression spring (elastic member) 33 provided between the preceding gear 31 and the output gear 30 is contracted.

Figures 14A, 14B, 14C, 14D:
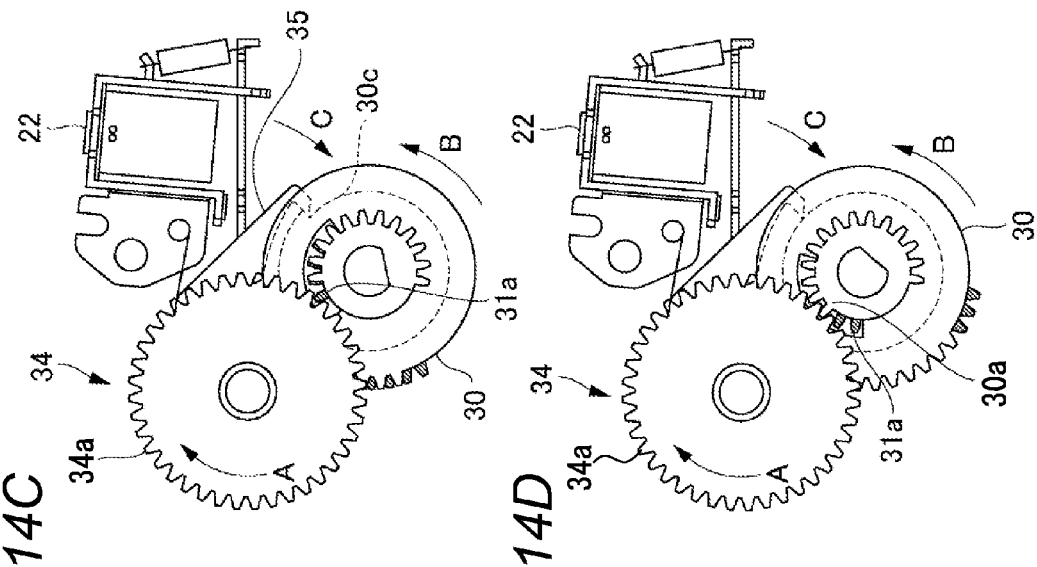
FIGS. 14A, 14B, 14C, and 14D are explanatory views illustrating the drive transmission operation of the drive transmission apparatus.

Then, at a phase at which the toothed portion of the partially-toothless large gear portion 30b terminates the meshing relationship with the small gear portion 34b, the latch arm 35 rotates in the direction indicated by the arrow C in FIG. 14C along the cam surface 30c of the output gear 30. Accordingly, the latch piece 35a moves from the latch position, at which the claw portion 311 is latched by the latch piece 35a, to an unlatch position, at which the claw portion 311 is unlatched from the latch piece 35a (FIG. 14A). In this manner, the preceding gear 31 is unlatched from the latch arm 35. Then, the preceding gear 31 starts to rotate in the direction indicated by the arrow B in FIG. 14A due to the elastic force of the compression spring 33. Accordingly, the preceding small gear portion 31a starts to mesh with the large gear portion 34a, and along with this, the preceding gear 31 starts to rotate (FIG. 14C).

Subsequently, when the coupling rib 314 abuts against the coupling rib 301 again by the rotation of the preceding gear 31, the output gear 30 starts to rotate (FIG. 14B). Then, the partially-toothless small gear portion 30a starts to mesh with the large gear portion 34a (FIG. 14D). In the state in which the coupling rib 314 abuts against the coupling rib 301, the gear pitches and the phases of the preceding small gear portion 31a and the partially-toothless small gear portion 30a are equal to each other, and hence the partially-toothless small gear portion 30a starts to mesh with the large gear portion 34a while adjusting the phase of the partially-toothless small gear portion 30a to the phase of the large gear portion 34a.

Figure 15A:
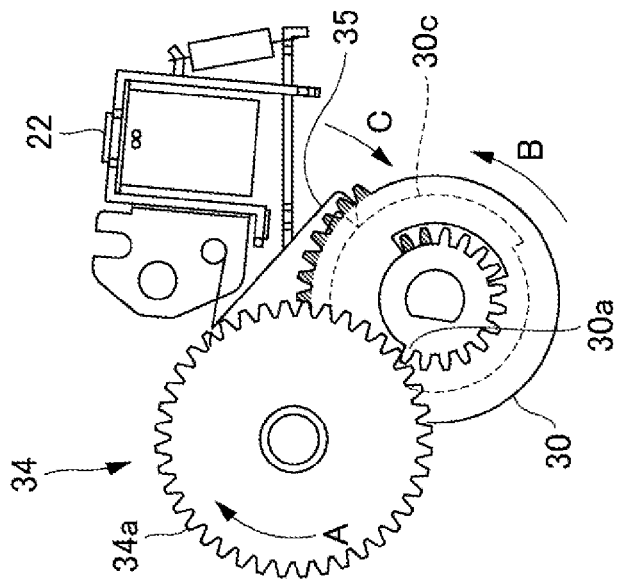
FIGS. 15A and 15B are explanatory views illustrating the drive transmission operation of the drive transmission apparatus.
Figure 15B:
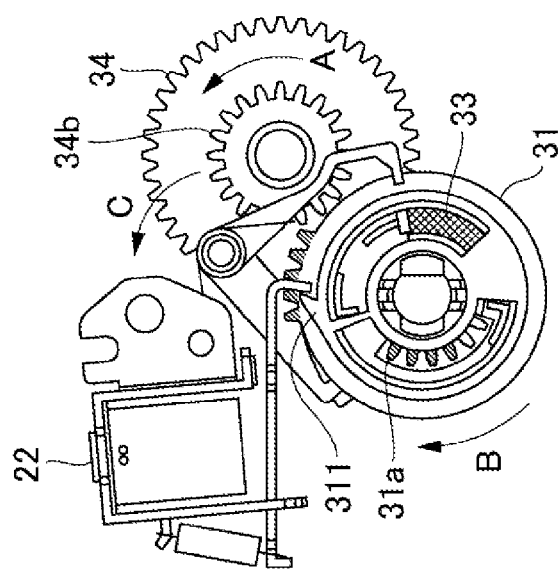

Subsequently, during the period in which the output gear 30 rotates due to a rotational force received from the input gear 34, the output gear 30 exerts a rotational force on the preceding gear 31 terminating the meshing relationship with the input gear 34 via the elastic force of the compression spring 33. When the claw portion 311 is then latched by the solenoid 22 in the OFF state, the preceding gear 31 returns to the initial state (FIG. 15A). Similarly, the latch arm 35 returns to the initial position due to the cam surface 30c of the output gear 30 (FIG. 15B). On the other hand, when the partially-toothless small gear portion 30a terminates the meshing relationship with the large gear portion 34a, the output gear 30 rotates (in the direction indicated by the arrow B in FIG. 15B) by the rotational force received from the latch unit of the output gear 30 described later. Then, the output gear 30 is latched by the latch unit in the position of the initial state.

Figure 16:
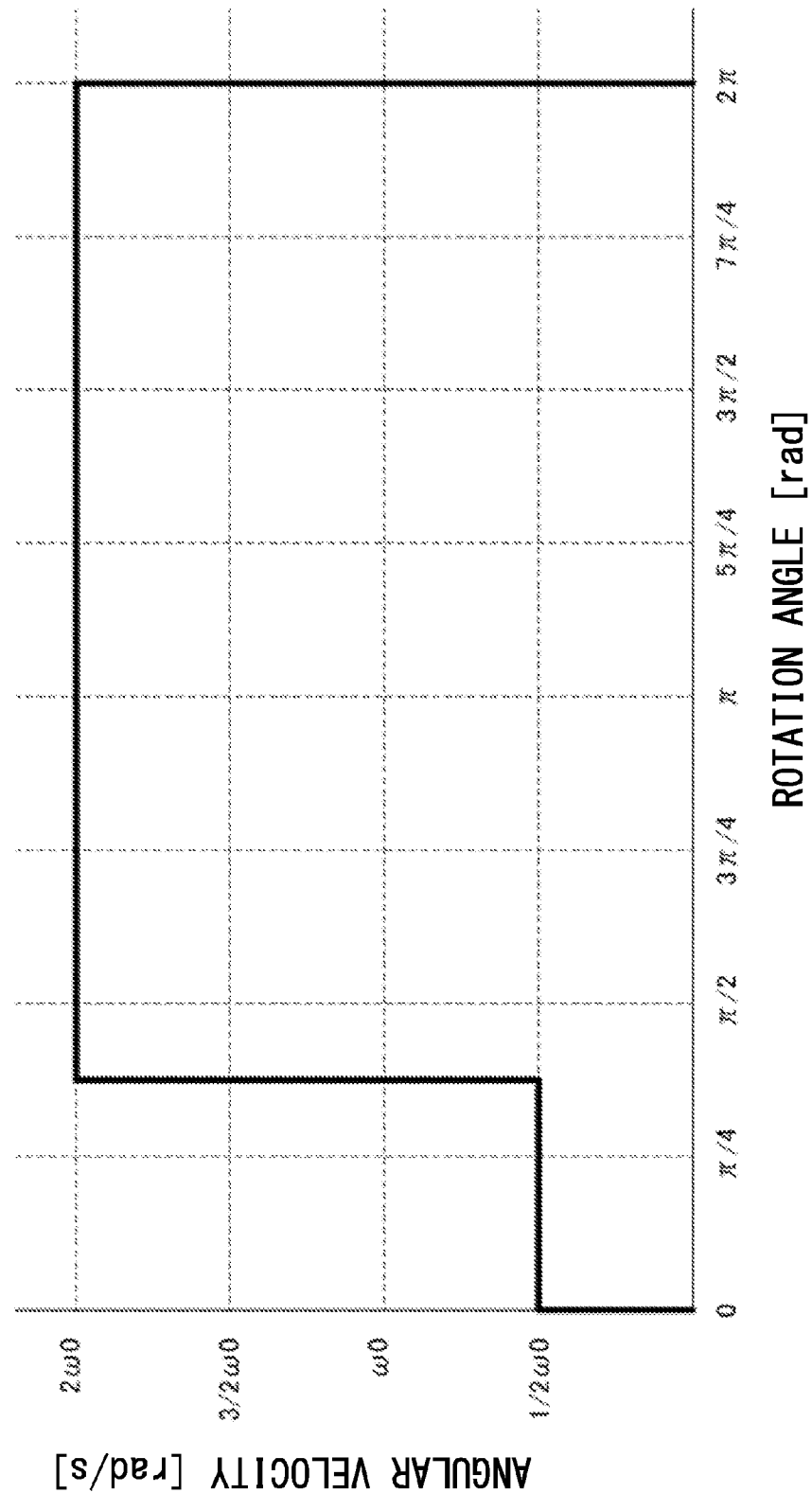
FIG. 16 is a graph showing a relationship between a rotation angle and an angular velocity of an output gear of the drive transmission apparatus.

FIG. 16 is a graph showing a relationship between a rotation angle and an angular velocity of the output gear 30 of the drive transmission apparatus 29. In FIG. 16, an angular velocity $\omega 0$ indicates an angular velocity of the input gear 34.

When the partially-toothless large gear portion 30b meshes with the small gear portion 34b, the angular velocity of the output gear 30 is $\frac{1}{2}\omega 0$ based on the above-mentioned gear ratio. When the partially-toothless small gear portion 30a meshes with the large gear portion 34a, the angular velocity of the output gear 30 is $2\omega 0$. That is, in the embodiment, the output gear 30 is driven at the low velocity of $\frac{1}{2}\omega 0$ during the initial stage of rotation represented by "$\frac{5}{12} \cdot \pi(\text{rad})$". Thus, the drive transmission apparatus 29 can rotate the output gear 30 at the low velocity only at the start of the rotation of the output gear 30.

Figure 17:
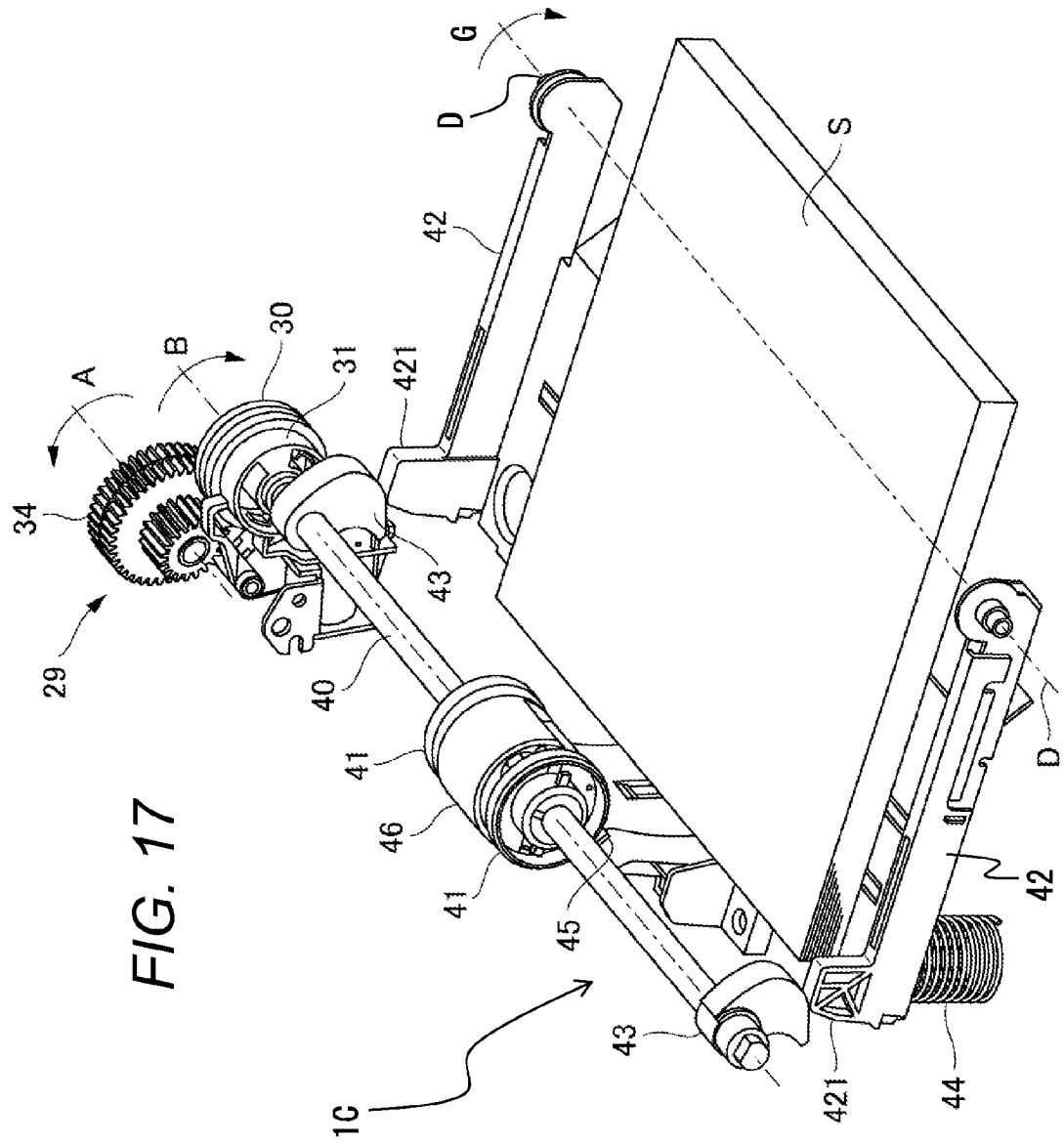
FIG. 17 is an explanatory view illustrating a sheet feed device provided with the drive transmission apparatus.

By the way, in the embodiment, the drive transmission apparatus 29 is used for controlling the rotation of the above-mentioned sheet feed device 1C illustrated in FIG. 1. FIG. 17 is a view illustrating the drive transmission apparatus 29 provided to the sheet feed device 1C. In the embodiment, the drive transmission apparatus 29 is arranged on a side end portion of the sheet feed device 1C.

In FIG. 17, a feed shaft 40 rotates integrally with the output gear 30. Stacking plate cams 43 are fixed at both ends (one end and the other end) of the feed shaft 40, and the semicircular feed roller 46 is fixed to the center of the feed shaft 40. In other words, the feed roller 46 is provided at the center of the sheet S in a direction orthogonal to the conveying direction of the sheet S. The rotatable feed members 41 are rotatably provided at both ends of the feed roller 46. A separation pad 45 is urged toward the feed roller 46 by an elastic force (urging force) of a spring (elastic member) 47 (FIG. 18A). The sheet stacking plate (sheet stacking portion) 42 is pivotable about an axis D in a vertical direction in FIG. 17 in a state in which the sheet S is stacked on the sheet stacking plate 42. The sheet stacking plate 42 is urged in the direction indicated by the arrow G in FIG. 17 by an urging force (elastic force) of a stacking plate spring (elastic member) 44 in the state in which the sheet S is stacked on the sheet stacking plate 42.

Projecting portions 421 which abut against the respective stacking plate cams 43 are provided at end portions of the sheet stacking plate 42 in a width direction orthogonal to the sheet feed direction. By the abutment of the projecting portions 421 against the respective stacking plate cams 43, the operation position of the sheet stacking plate 42 is regulated. Note that, FIG. 17 illustrates an initial state, in which the sheet stacking plate 42 is separated from the feed roller 46 by the stacking plate cams 43 and the rotation of the sheet stacking plate 42 is therefore stopped.

FIGS. 18A and 18B are explanatory views illustrating a latch unit 29A constructed of the projecting portions 421 provided on the sheet stacking plate 42 and the respective stacking plate cams 43. FIG. 18A illustrates a state of the drive transmission apparatus 29 corresponding to the state illustrated in FIGS. 15A and 15B described above. Specifically, FIG. 18A illustrates a state in which the feed shaft 40, the stacking plate cams 43, and the feed roller 46 perform substantially one revolution in the direction indicated by the arrow B in FIG. 18A integrally with the output gear 30 and therefore return to their initial states.

The stacking plate cams 43 are provided with slope portions 43a, respectively. When the projecting portions 421 abut against the respective slope portions 43a, the elastic force of the stacking plate spring (elastic member) 44 is exerted on the stacking plate cams 43 in the direction indicated by the arrow E in FIGS. 18A and 18B. By the elastic force, the stacking plate cams 43 rotate in the direction indicated by the arrow B in FIG. 18A, and thus the output gear 30 can return to the initial position as described above.

On the other hand, FIG. 18B illustrates a positional relationship between the stacking plate cams 43 and the projecting portions 421 in their initial states. The projecting portions 421 are fitted into depressed portions 43b provided in the stacking plate cams 43, respectively, and a force from the projecting portions 421 is directed to the rotation center of the stacking plate cams 43. Thus, the rotational force is not exerted on the stacking plate cams 43, and as a result, the output gear 30 connected to the stacking plate cams 43 is also maintained in the stopped state.

FIGS. 19A and 19B are explanatory views illustrating the feed operation of the sheet feed device 1C in association with the operation of the drive transmission apparatus 29. FIG. 19A illustrates a state in which the uppermost surface of the sheets S stacked on the sheet stacking plate 42 abuts against the rotatable feed members 41. Specifically, FIG. 19A illustrates a state in which the output gear 30 rotates in the direction indicated by the arrow B in FIG. 19A from the position of the initial state and the sheet stacking plate 42 has therefore been raised along the stacking plate cams 43. Note that, the state of the drive transmission apparatus 29 at this time corresponds to the state in FIG. 14A. Thus, the series of operations from the initial state to the state in FIG. 19A is performed by the mesh between the partially-toothless large gear portion 30b and the small gear portion 34b.

FIG. 19B illustrates the subsequent feed operation. Specifically, the operation is performed by the mesh between the partially-toothless small gear portion 30a and the large gear portion 34a, which is described with reference to FIG. 14B and subsequent figures. By the operation of the drive transmission apparatus 29, the feed roller 46 having an arc portion larger in outer diameter than the rotatable feed members 41 abuts against the uppermost surface of the sheets S which abuts against the rotatable feed members 41. Then, the feed roller 46 rotates to convey only one of the sheets S separated by the action of the separation pad 45. After that, the stacking plate cams 43 push down the projecting portions 421, and the series of feed operations is completed, with the result that the state returns to the initial state.

As described above, in the embodiment, by the drive force transmission of the drive transmission apparatus 29, the feed operation to be performed until the sheet S on the sheet stacking plate 42 abuts against the rotatable feed members 41 can be performed by rotating the output gear 30 at the low velocity as shown in FIG. 16. Further, when feeding the sheet S by the rotation of the feed roller 46, the feed can be performed by rotating the output gear 30 at the high velocity. Thus, it is possible to suppress the vibration and impact sound of the sheet feed device 1C, which may be generated when the sheet S on the sheet stacking plate 42 abuts against the rotatable feed members 41.

Further, in the drive transmission apparatus 29 of the embodiment, the preceding gear 31 is unlatched by the cam shape provided to the output gear 30. In other words, if the phases of the last tooth of the toothed portion of the output gear 30 and the cam shape are set with high accuracy, the preceding gear 31 can be unlatched reliably when the toothed portion terminates the meshing relationship. Further, unwanted deceleration of the rotation of the output gear 30 can be prevented. Thus, irregular rotation of the gear can be suppressed.

Note that, in the above-mentioned structure, in which the output gear is rotated at the first velocity and then rotated at the second velocity, the first velocity is set as an angular velocity lower than the second velocity. However, the present invention is not limited thereto. Specifically, the first velocity may be set higher than the second velocity.

In this case, the diameter of the first drive gear portion is set smaller than the diameter of the second drive gear portion, and the diameter of the first output gear portion is set larger than the diameter of the second output gear portion. Accordingly, the rotational velocity (first velocity) of the output gear which rotates by the mesh between the first output gear portion and the second drive gear portion can be set higher than the rotational velocity (second velocity) of the output gear which rotates by the mesh between the second output gear portion and the first drive gear portion. As described above, when the present invention is applied to, for example, the rotary developing device 9A under the condition that the rotational velocity of the output gear is set variable from a high velocity to a low velocity, it is possible to suppress vibration and impact sound of the developing device, which may be generated when the developing roller abuts against the photosensitive drum. Further, when the present invention is applied to, for example, the sheet feed device 1C, the rotatable feed members 41 in the feed operation can more softly be brought into contact with the sheet S stacked on the sheet stacking plate 42. Thus, it is possible to suppress vibration and impact sound of the sheet feed device.

Note that, specific values are exemplified in the embodiments described above. However, the present invention is not limited thereto, and any appropriate values may be employed.

According to the embodiments, the vibration and impact sound can be suppressed and the smooth drive transmission can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105102, filed May 2, 2012, which is hereby incorporated by reference herein in its entirety.

REFERENCE SIGNS LIST 1 color laser printer
1A color laser printer main body
1B image forming portion
1C sheet feed device
9A rotary developing device
19 drive transmission apparatus
20 output gear
21 preceding gear
22 solenoid
23 compression spring
24 input gear
25 latch spring
29 drive transmission apparatus
30 output gear
30c cam surface
31 preceding gear
34 input gear
35 latch arm
46 feed roller
201, 214 coupling rib
S sheet

The invention claimed is:

1. A drive transmission apparatus, comprising:
a drive gear having a first drive gear and a second drive gear, the drive gear being driven by a drive source to rotate at a constant velocity;
an output gear having a first output gear which has a toothless portion and is configured to mesh with the first drive gear, and a second output gear which has a toothless portion and is configured to mesh with the second drive gear;
a preceding gear having a first preceding gear which has a toothless portion and is configured to mesh with the first drive gear, and a second preceding gear which has a toothless portion and is configured to mesh with the second drive gear;
a preceding gear regulating portion configured to regulate rotation of the preceding gear;
an urging portion configured to urge the preceding gear to mesh with the drive gear; and
an interlocking portion configured to integrally rotate the output gear in association with the rotation of the preceding gear so that the output gear meshes with the drive gear,
wherein the drive gear, the preceding gear, and the output gear are configured in a manner that:
the second preceding gear meshes with the second drive gear, as a result of regulation of the rotation of the preceding gear by the preceding gear regulating portion being canceled and the urging portion urging the preceding gear to rotate, and the second output gear meshes with the second drive gear, as a result of the interlocking portion rotating the output gear integrally with the preceding gear, so that the output gear rotates at a first velocity; and
after the second output gear then terminates a meshing relationship with the second drive gear, the first output gear meshes with the first drive gear so that the output gear rotates at a second velocity.

2. A drive transmission apparatus according to claim 1, wherein a diameter of the first drive gear is larger than a diameter of the second drive gear, and
wherein a diameter of the first output gear is smaller than a diameter of the second output gear.

3. A drive transmission apparatus according to claim 1, wherein the first velocity is lower than the second velocity.

4. A drive transmission apparatus according to claim 1, wherein a diameter of the first drive gear is smaller than a diameter of the second drive gear, and
wherein a diameter of the first output gear is larger than a diameter of the second output gear.

5. A drive transmission apparatus according to claim 1, wherein the first velocity is higher than the second velocity.

6. A drive transmission apparatus according to claim 1, wherein the preceding gear regulating portion comprises:
a latch portion provided on the preceding gear; and
a solenoid having a latch piece, which is configured to disengageably engage with the latch portion.

7. A drive transmission apparatus according to claim 1, further comprising an output gear immobilizing portion configured to maintain the output gear in an immobilized state,
wherein, when the interlocking portion rotates the output gear integrally with the preceding gear, immobilization of the output gear by the output gear immobilizing portion is canceled.

8. A drive transmission apparatus according to claim 1, wherein, when the interlocking portion rotates the output gear integrally with the preceding gear, a phase of the preceding gear is equal to a phase of the output gear.

9. An image forming apparatus, comprising:
an image bearing member on which a latent image is to be formed;
a rotary developing device configured to develop the latent image formed on the image bearing member; and a drive transmission apparatus as recited in claim 1, which drives the rotary developing device.

10. An image forming apparatus, comprising:
a feed device configured to feed a sheet; and
a drive transmission apparatus as recited in claim 1, which drives the feed device.

\* \* \* \* \*